United States Patent [19]

Wagner et al.

[11] Patent Number: 5,123,615
[45] Date of Patent: Jun. 23, 1992

[54] SYSTEM AND COMPONENTS USEFUL IN LANDING AIRBORNE CRAFT

[75] Inventors: Nicholas L. Wagner; Geoffrey Cunliffe, both of Mississauga, Canada

[73] Assignee: Indal Technologies Inc., Mississauga, Canada

[21] Appl. No.: 701,292

[22] Filed: Apr. 29, 1991

Related U.S. Application Data

[63] Continuation of Ser. No. 305,466, Feb. 2, 1989, abandoned.

[30] Foreign Application Priority Data

Feb. 3, 1988 [CA] Canada .................................. 558035

[51] Int. Cl.⁵ .............................................. B64F 1/20
[52] U.S. Cl. .................................... 244/116; 340/946; 340/948; 340/952; 359/723; 359/590
[58] Field of Search ........... 244/115, 116, 161, 135 A, 244/17.17; 350/439, 166; 358/103, 108; 362/62; 340/948, 947, 946, 958, 952, 950

[56] References Cited

U.S. PATENT DOCUMENTS

| | | | |
|---|---|---|---|
| 3,210,029 | 10/1965 | Brusch et al. | 244/114 R |
| 3,278,680 | 10/1966 | Hummel | 358/103 |
| 3,285,533 | 11/1966 | Jernigan, Jr. | 244/161 |
| 3,452,697 | 7/1969 | Flanders | 244/114 R |
| 3,659,813 | 5/1972 | Mesnet et al. | 244/116 |
| 3,721,499 | 3/1973 | Narbaits-Jauregu | 340/948 |
| 3,794,270 | 2/1974 | Wilkens | 214/161 |
| 4,123,020 | 10/1978 | Korsak | 244/116 |
| 4,174,081 | 11/1979 | Sardanowsky | 244/115 |
| 4,209,767 | 6/1980 | Flanders | 340/947 |
| 4,233,552 | 11/1980 | Oswald | 362/62 |
| 4,295,740 | 10/1981 | Sturges, Jr. | 244/161 |
| 4,420,132 | 12/1983 | Martin | 244/115 |
| 4,588,150 | 5/1986 | Bock et al. | 244/115 |
| 4,786,014 | 11/1988 | Pesando et al. | 244/115 |
| 4,834,321 | 5/1989 | Granger | 244/115 |
| 4,890,802 | 1/1990 | Burgess et al. | 244/115 |

FOREIGN PATENT DOCUMENTS

781808  4/1968  Canada .................................. 244/116

*Primary Examiner*—Michael J. Carone
*Attorney, Agent, or Firm*—Ivor M. Hughes; Neil H. Hughes

[57] ABSTRACT

An improved system is provided suitable for use in landing an aircraft (for example, helicopter, RPV, VTOL) on shipboard comprising a support, base, platform or housing, reciprocal from remote a landing area on the deck of a ship to a position proximate the landing area, the housing carrying an upwardly directed light sensor comprising a lens system and a pair of band-pass filters, one filter before the lens system of the sensor and one after the lens system, the filters each passing the identical wavelength of light at its center but which each need not have the same band width as the other, a pulse detector in close proximity to the upwardly directed light sensor, and means for securing the aircraft to the support, housing, base or platform.

37 Claims, 19 Drawing Sheets

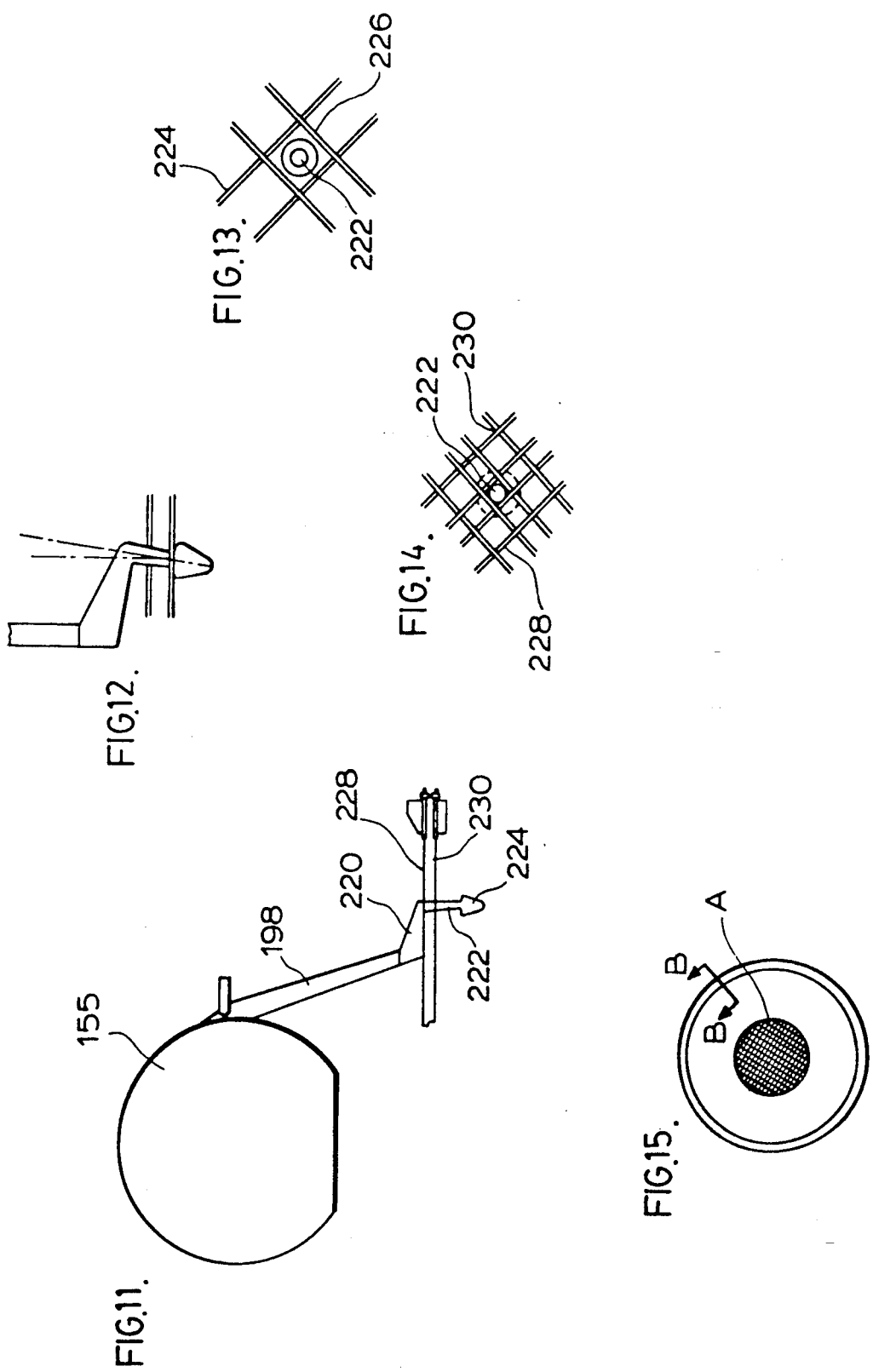

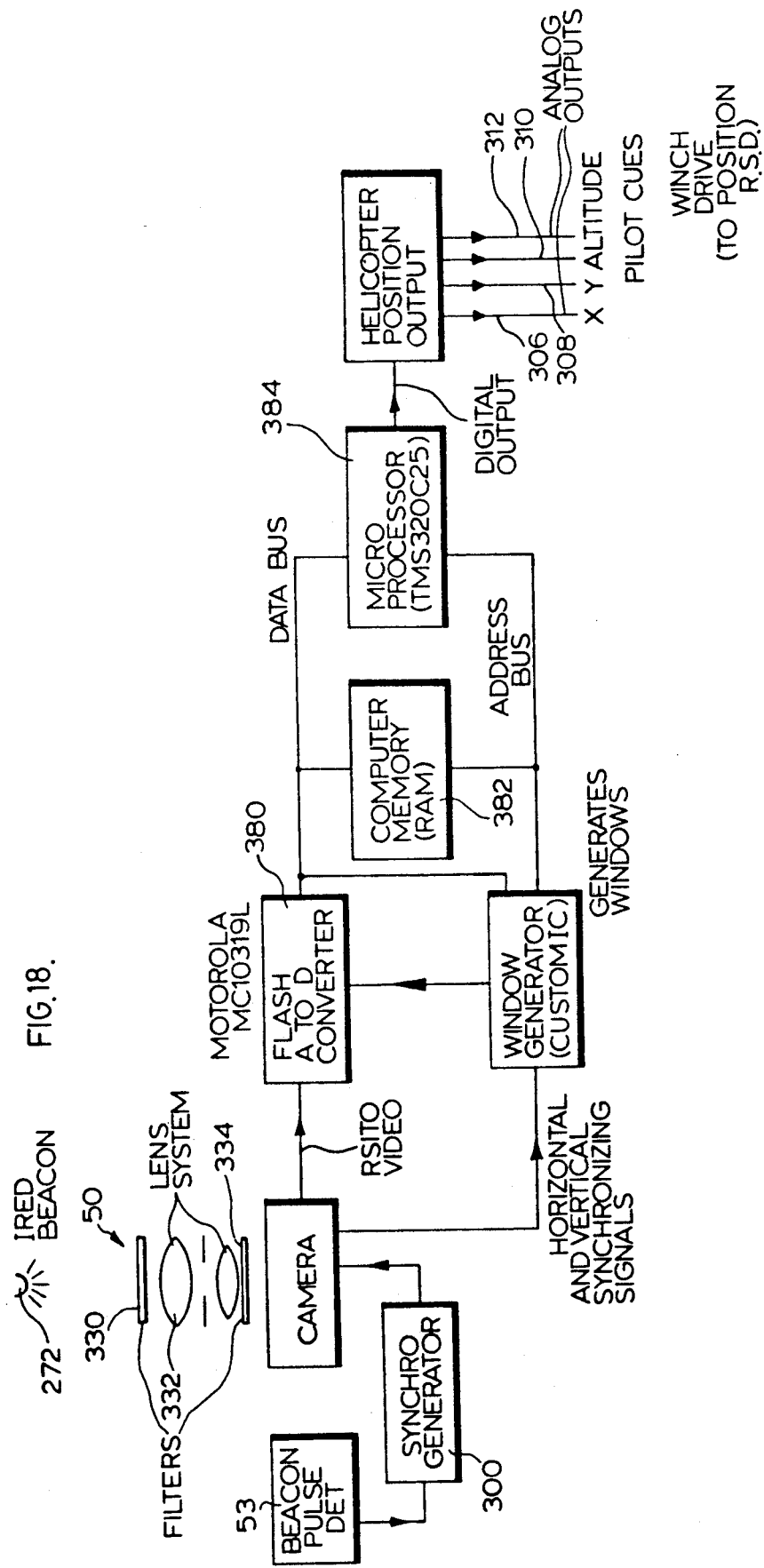

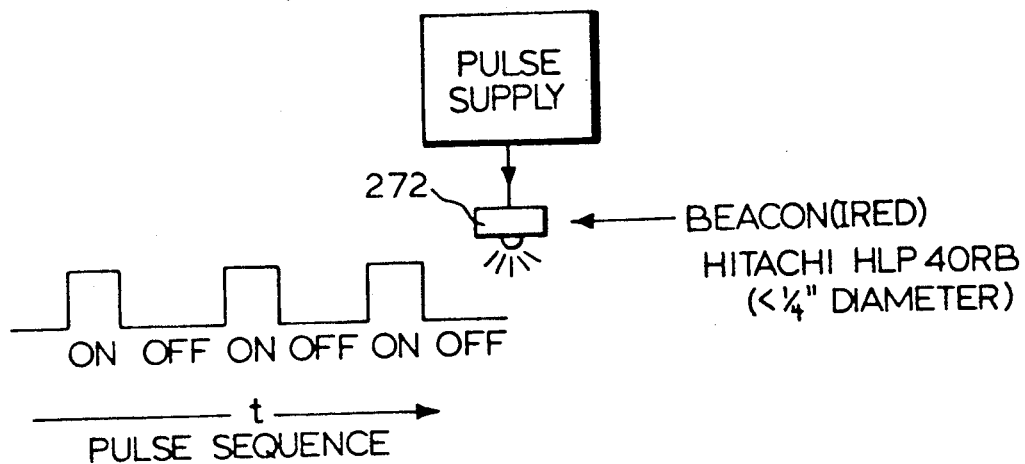
FIG.18A.
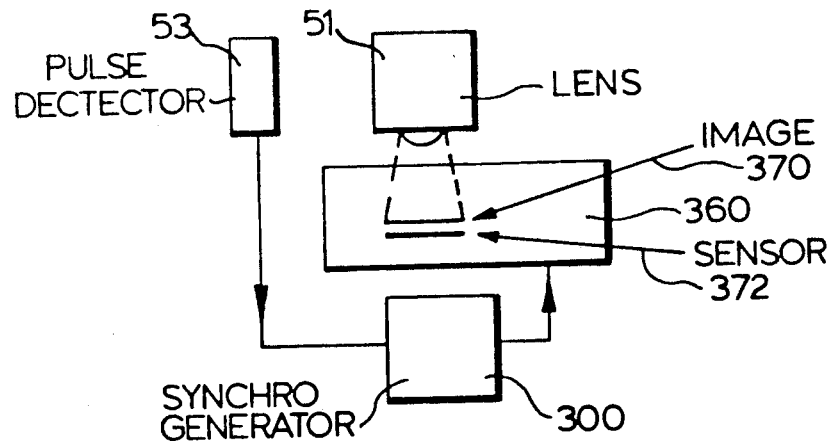

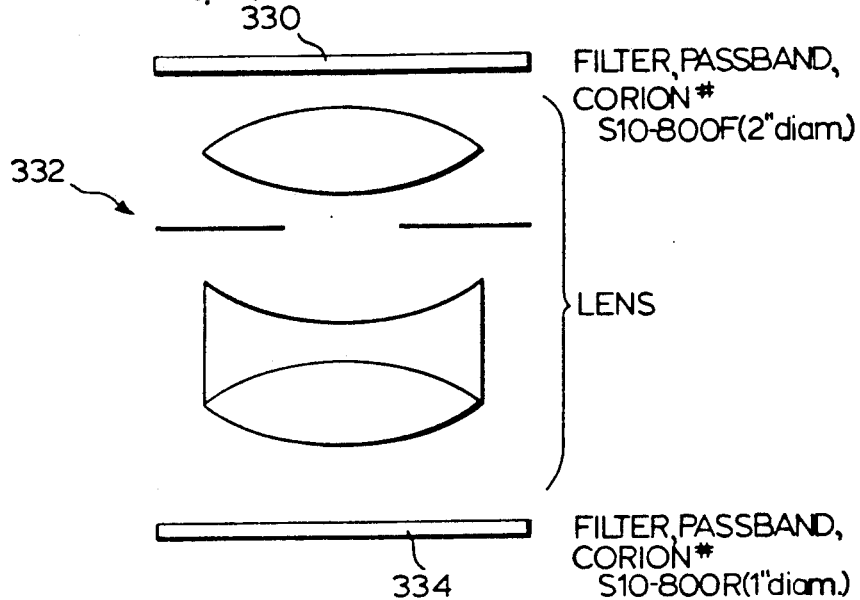
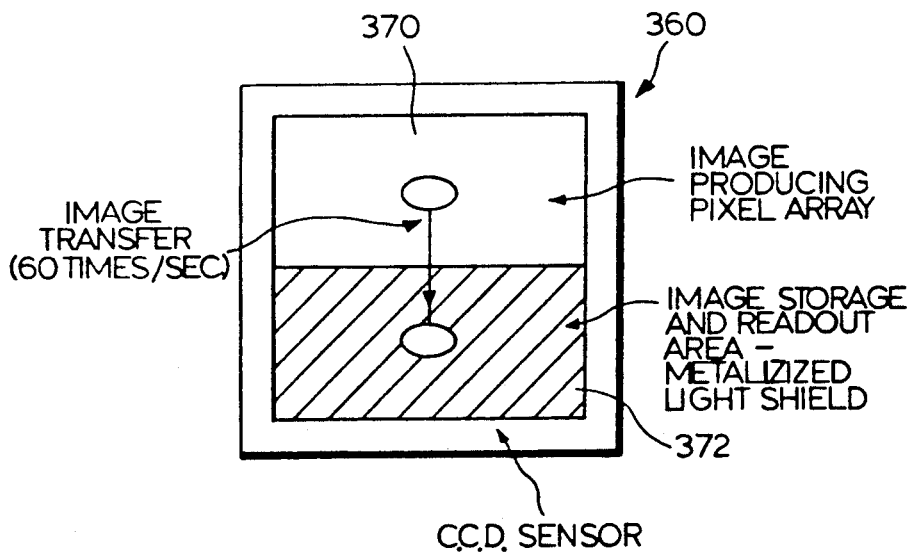

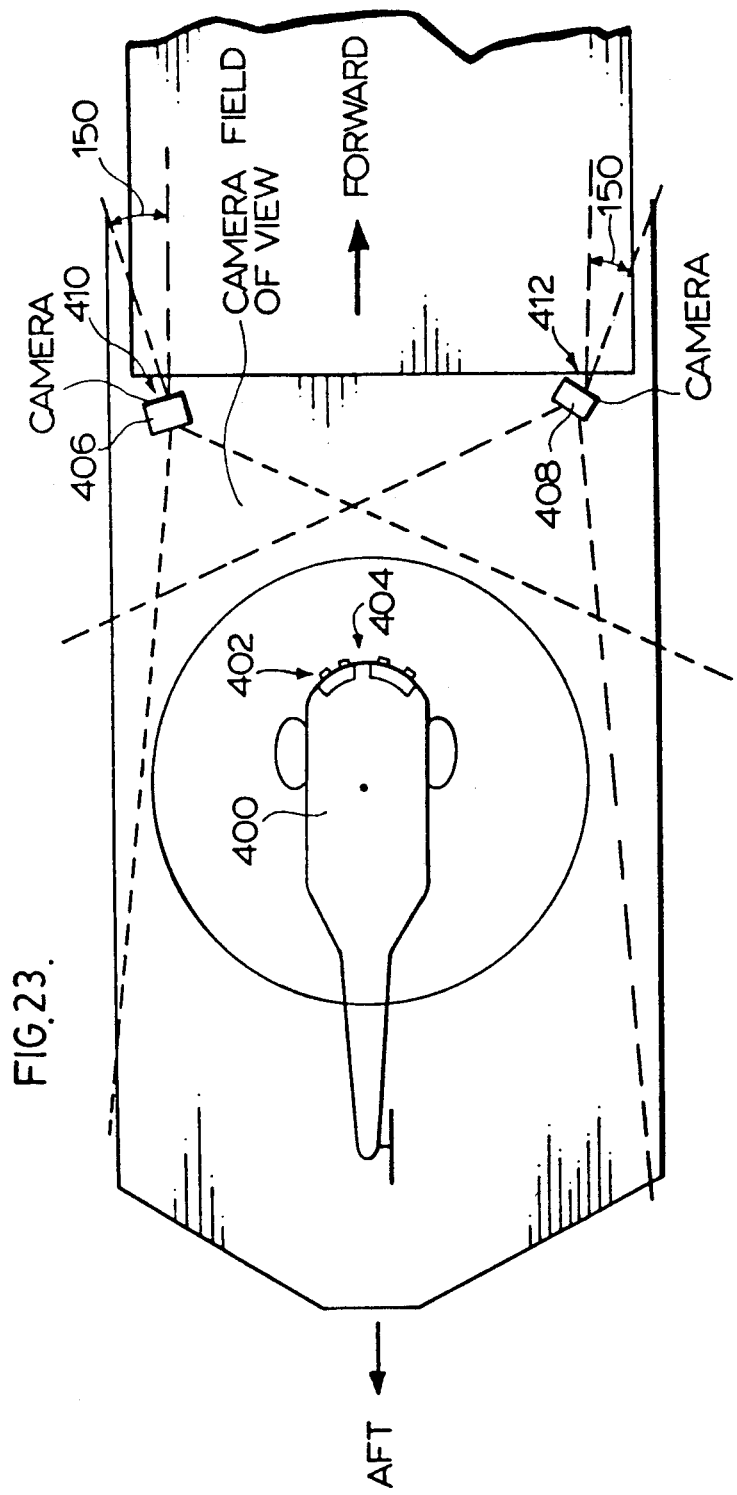

SYSTEM AND COMPONENTS USEFUL IN LANDING AIRBORNE CRAFT

CROSS REFERENCE TO A RELATED APPLICATION

This application is a continuation of U.S. Ser. No. 07/305,466 filed Feb. 2, 1989, now abandoned.

FIELD OF INVENTION

This invention relates to the recovery of aircraft, for example helicopters, remotely piloted vehicles (RPV) and vertical take-off landing (VTOL) aircraft, on board a ship, and systems and components thereof suitable for use for effecting such recovery.

BACKGROUND OF THE INVENTION

Helicopters have now become entrenched as an integral part of the weapons system carried by destroyers and frigates in anti-submarine search and strike capacity. Invariably, landings and take-offs of these helicopters from vessels must be made in moderate to severe turbulence and once on the deck, the helicopter must be quickly secured and stored for protection from the environment.

Two such helicopters are the Sea Hawk (trade mark) and Sea King (trade mark).

The Sea King, a 20,000 pound helicopter includes a conventional undercarriage comprising a rear wheel free wheeling through 360 degrees and a pair of spaced dual wheel units on either side, and near the nose of the helicopter. For recovery, employing the RAST System (Recovery Assist Secure and Traverse System) for helicopter recovery, the Sea King mounts externally on its underside an airborne messenger winch intermediate the rear wheel and a pair of dual wheel units. The messenger winch holds a light duty cable with a messenger link and lock assembly for the flydown cable. When the flydown cable from the self-centering and self-balancing sliding bell mouth is secured to the messenger winch, a constant tension is maintained in the cable until the helicopter is landed safely. Once the helicopter has landed an increased tension is applied automatically by the electric tension winch for securing the helicopter.

After landing, the Sea King helicopter is moved into the hangar.

In Canadian Letters Patent No. 781,808 a helicopter rapid securing system is disclosed employing a constant tension winch used to maintain the tension in the cable securing the airborne helicopter to the ship and a frame surrounding the fairlead through which the cable extends below deck, supporting two parallel arresting rails for firing towards one another from opposite sides to the frame to capture the probe of the helicopter securing the cable to the helicopter when the helicopter has landed to secure the helicopter to the deck. Thereafter, the frame is withdrawn along the track traversing the Sea King helicopter to the hangar.

While the method described in Canada Letters Patent No. 781,808 is fast and reliable, it is also very expensive. However, because the capture and traverse functions are carried out by the same structure involved in helicopter haul-down, it is also safe. When the helicopter lands, not only is it secured to the ship's deck, it is also simultaneously secured to the traverser used for traversing it to the hangar. However, the said structure is complex and costly both to buy and maintain. Additionally, because the arresting beams are fired from opposite sides of the frame to engage the probe within the confines of the frame, the landing area is fixed in size.

U.S. Pat. No. 4,123,020 teaches an arm carrying a pair of digits arranged to move on a track by means of a right and left screw jack which is driven by a hydraulic motor. Each of the digits carries clamping jaws to secure the stud of the VTOL between the digits. This structure is not practical. Neither is the structure shown in the U.S. Pat. No. 4,420,132. The scissors action of the arms may damage the probes.

U.S. Pat. No. 3,659,813 discloses the use of a trolley to which a helicopter is secured for traversing once on the deck of a ship. The trolley is displaceable along a worm gear mounted on the cross strut driven in a linear path by a drive mechanism. However, this system cannot be used to rapidly secure the helicopter on landing. It is merely a type of traversing device.

In Canadian Patent Application No. 494,567 there is disclosed a helicopter rapid securing and traversing system and securing means for securing a helicopter upon landing on the deck of a ship for subsequently traversing it from its landing position, said system comprising a housing reciprocal from a position remote the landing area to a position adjacent the landing area of the helicopter (for example, in a track) the housing carrying a shock absorber and sensing means extending across the housing for contacting a probe or other projection (such as a wind housing) extending from the helicopter on the exterior of the helicopter when the helicopter has landed on the deck and the housing is brought to engage the probe or other projection, the shock absorbing bar and sensing means for slowing and stopping the movement of the housing when the probe or projection is engaged and for cushioning the engagement (as for example, to engage a switch turning off the electrical power to a motor used to move the housing to the helicopter landing area) and for sensing the position of the probe or projection, the sensing means in one embodiment being incorporated with the shock absorber in one structure, and in another embodiment being separate from the shock absorber and being a sensing bar which extends parallel to the carrier and shock absorber and being positioned along the centre line of a laterally opening mouth of securing means for securing to the probe or projection carried by a carrier on the housing in either case to stop the probe in a position along the centre line of the mouth, means for reciprocating the housing towards and away from the landing area, a carrier on the housing and carrying securing means thereon for securing the housing to the probe or projection on the helicopter, (in a preferred embodiment being a lead screw extending across the housing, and in another embodiment, either a hydraulically or electrically driven chain), the securing means being normally secured at one side of the housing on the carrier and being moved laterally along the carrier across the housing when the carrier is activated to capture the probe or projection, the securing means carrying a laterally opening mouth opening in the direction towards the probe, and means to operate the carrier (in one embodiment where the carrier for the securing means comprises a lead screw, the means to operate the lead screw comprises a high speed electric motor for turning the lead screw to move the securing means therealong by reciprocal means on the securing means engaging the lead screw and a slow speed high torque electric motor for turning the lead screw once the probe is grasped by the securing means, means to deactivate the high speed motor when the probe is grasped by the securing means but not lock the motor, permitting it to free wheel and a clutch for connecting the slow speed high torque electric motor to the lead screw when the high speed motor is deactivated), whereby when the probe or projection engages the shock absorber and sensing means, the impact of the probe is cushioned and the position of the probe or projection is sensed relative to the mouth of the securing means whereby when the probe is sensed as positioned in line with the mouth of the securing means, the carrier moves the securing means to grasp and secure the probe or projection and when the probe is sensed not to be appropriately positioned, the system is activated to cause the system to be appropriately positioned relative to the probe.

In one embodiment the helicopter rapid securing and traversing system provided for securing the helicopter upon landing on the deck of the ship and for subsequently traversing it from its landing position, comprises:

a housing reciprocal from a position remote the landing area to a position adjacent the landing area of a helicopter (for example, in a track) carrying a shock absorbing bar extending across the housing for engaging a probe or other projection (such as a winch housing) extending from the helicopter on the exterior of the helicopter when the helicopter has landed on the deck of the ship and the housing is brought to engage the probe or other projection, the shock absorbing bar for cushioning the impact of the probe or other projection when the probe or other projection engages the shock absorbing bar carried by the housing to slow and stop the movement of the housing (as for example, to engage a switch turning off the electrical power to a motor used to move the housing to the helicopter landing area);

means for reciprocating the housing towards and away from the landing area;

a carrier on the housing extending parallel to the shock absorbing bar but closer to the housing than the shock absorbing bar (in a preferred embodiment being a lead screw extending across the housing, and in another embodiment, either a hydraulically driven or electrically driven chain drive);

the carrier carrying securing means thereon for securing the housing to the probe or other projection on the helicopter, the securing means being normally secured to one side of the housing on the carrier for being moved laterally from one side of the housing towards the other side when the carrier is activated to move laterally across the housing, the capture the probe or projection;

the securing means carrying a laterally opening mouth opening in the direction towards the probe;

sensing means for sensing the position of the probe relative to the mouth of the securing means whereby when the probe is sensed to be positioned in line with the mouth of the securing means the housing is stopped so that when the securing means is moved by the carrier, the securing means will grasp and secure the probe or projection and when the sensing means senses the probe is not appropriately positioned (as for example, when the helicopter and thus the probe has moved away), the system is activated to cause the system to be appropriately positioned relative to the probe), (the sensing means in one embodiment being a sensing bar which extends parallel to the carrier and shock absorbing bar and is positioned closer to the housing than the shock absorbing bar and being positioned along the centre line of the laterally opening mouth of the securing means and in one embodiment the sensing means being incorporated with the shock absorbing bar in one structure, in both embodiments to stop the system in a position wherein the probe is along the centre line of the mouth, for example, by depressing and causing a switch to be engaged, stopping movement of the housing when the housing is slowed down and stopped when the probe or other projection is engaged permitting the carrier to move the securing means laterally across the housing to capture the probe); means to operate the carrier (in one embodiment where the carrier for the securing means comprises a lead screw, the means to operate the lead screw comprises a high speed electric motor for turning the lead screw to move the securing means therealong by reciprocal means on the securing means engaging the lead screw and a slow speed high torque electric motor for turning the lead screw once the probe is grasped by the securing means, means to deactivate the high speed motor when the probe is grasped by the securing means but not lock the motor permitting it to free wheel, and a clutch for connecting the slow speed high torque electric motor to the lead screw when the high speed motor is deactivated.

It is also now widely accepted that RPVs (Remotely Piloted Vehicles) have the potential to fill several significant military roles. The majority of the effort to date has addressed land based RPV systems and very little has been done on the development of ship based systems.

Use of RPVs in the Naval environment [Shipboard Launch and Recovery system (SLAR) and the RPV] adds a number of new challenges, for the proposed short range RPV, in particular operating from frigate sized and smaller ships means taking off from, and landing on, an unstable moving deck, with severe airwake turbulence from the superstructure and very tight space constraints both during operation and stowage. A strong trend is already emerging in favour of RPVs with a VTOL capability for the maritime role because of the demonstrated difficulties of landing a fixed wing air vehicle on even relatively large and stable ships' decks. On land, the VTOL RPV requires little or no launch and recovery support and hence this area of development has been largely ignored. In the shipboard application this is not true.

Requirements for launch, recovery and handling systems are only just starting to be formulated. However, a consensus is emerging that RPVs should be capable of operating off frigate sized ships in at least sea state 3 with 10° roll, 3° pitch (typically) and ideally up to sea state 5 with 30° roll, 10° pitch compatible with current United States and Canadian Navy helicopter operational limits.

Initial RPV placements will probably be on ships which are already operating with one or more helicopters; however, the system must also be adaptable to smaller, non-flight deck equipment ships. On existing flight decks, the goal must be to complement the helicopter capability rather than to displace it. To this extent, the RPV must operate on a non-interference basis and share the already cramped quarters in the hangar. The RPV system must require minimal additional crew members for operation or maintenance, as well as minimizing any additional skill levels.

There are five (5) distinct phases in the launch, recovery and handling of RPVs from small ships; recovery assistance, securing, traversing or deck handling, stowage and of course launch.

Recovery assistance requirements will, to a great extent, depend on the stability characteristics of a number of elements - the UMA, the operating envelope limits and the ship motion and associated airwake turbulence.

A very stable and controllable air vehicle operating in relatively calm conditions may not require any specific recovery assistance other than that provided by the normal RPV operator.

In higher sea states and/or with a less stable air vehicle the operator workload will increase dramatically to the point where some form of recovery assistance becomes mandatory. The Naval helicopter pilot has difficulties under such conditions. The situation is even worse for an RPV operator for several reasons. Although the operator can maintain good visual contact with the RPV, he lacks the "seat of the pants" acceleration feedback. He also has difficulty in judging RPV position since he is, most likely, looking up at the RPV and has no references in the background to provide visual cues as to the RPV's position relative to the ship. Finally, the RPV being a much smaller craft, is far more susceptible to wind shears and high frequency turbulence in the airwake behind the ship's hangar or other superstructure.

Whatever form of recovery assistance is provided, the goal must be to eliminate flight deck personnel during launch and recovery operations.

Once landed, the RPV needs to be secured as quickly as possible; ideally before the end of the quiescent period to avoid it sliding across the deck (or worse still, toppling) during the next roll or pitch cycle.

In U.S. Pat. No. 4,890,802, a landing and securing platform is provided for the landing of an RPV thereon and which can be released from the landing point to become a dolly which may be maneuvered normally to and from a hangar. Alternatively, the platform can be secured by cables and winched across the flight deck. Ideally to preserve maximum security, the platform is guided along and restrained by some form of track or rail. This track could be either an existing track or a separate lightweight surface mounted track. Any track installation of course must not interfere with helicopter operations or be subject to damage during vertical replenishment. If an existing track is used, the platform should have a means of disengagement from the track inside the hangar, and preferably an auxiliary track to take it to its stowage area.

In the said application, a capturing, securing and traversing system for an RPV is provided suitable for use on shipboard, the system comprising a pair of grids overlying one another, the lower grid moveable (rotatable or translation) relative to the upper grid, each grid comprising rigid cables or wires crossing one another for receiving a probe therethrough, the RPV having a lower support (for example a plurality of legs or a ring) comprising a plurality of broad pads at the lower end thereof to each sit on the upper grid without penetrating through the grid, the undersurface of pads carrying a downwardly extending probe (or finger) of a length sufficient to pass through both grids, preferably the lower end carrying means (for example a larger or bulbous end) whereby when the probe passes through the two grids, the probe becomes clamped by the grids after the lower grid has been moved (either by rotation or translation) and the probes are precluded from being withdrawn (for example by precluding the bulbous or larger ends of the probes (or fingers) from passing through the spaces between rigid cables or wires of the upper and lower grids engaging both sides of the probes (or fingers)).

There is also provided a capturing, securing and traversing system for an RPV suitable for use on shipboard, the system comprising a grid comprising rigid cables or wires crossing one another for receiving a probe therethrough, the RPV having a lower support (for example a plurality of legs or a ring) comprising a plurality of broad pads at the lower end thereof to each sit on the grid without penetrating the grid, the undersurface of the pads carrying a downwardly extending probe (or finger) of a length sufficient to pass through both grids, the lower end of the probes each carrying means to temporarily expand the lower end of probes to preclude the withdrawal thereof from the grids. The lower end of the probe may carry a plurality of wings retractable into the body but upon being extended, extends transverse the length of the probe to preclude probe withdrawal.

There is also provided a capturing, securing and traversing system for an RPV suitable for use on shipboard, the system comprising a platform comprising a plurality of slots (preferably extending radially towards the center of the platform), each slot carrying a vertically extending arm movable in the slot carrying means (for example a laterally extending finger) for securing to the support (for example bottom ring or legs of the RPV) when moved radially towards the center and means for moving the arms in the slots (for example a lead screw operated by a motor and gears). It will be appreciated that by moving the arms after the means on the arms engage and secure the support (for example the legs or ring) to the system, the further movement of the arms can cause the RPV to be moved to center the RPV on the platform. For example, if each of the arms is operated by lead screws and if the lead screws are synchronized in their operation, the RPV may be moved on the platform (for example centered). In one embodiment the means may comprise laterally extending flanges which may extend over the support (for example ring) or clamp the support (ring or legs).

The laterally extending fingers may be secured to raised arms which can be retracted into and extended from the sides of the platform. Thus where the RPV is supported on a pair of parallel skids, the arms may be extended laterally from the platform prior to the landing of the RPV and after the RPV has landed, the arms are retracted causing the arms to be retracted with the ringers overlying the skids.

Each of the above systems (for example grids and platforms) may be mounted for movement on the ship deck. In this regard, each of the systems may be pinned to a cable and may be traversed on the ship deck (for example either in a surface mounted track or in a track permanently constructed in the deck).

To assist in the landing of helicopters, video cameras (part of video system) have been proposed to be mounted on the face of the hangars in which the helicopters are to be stored and reflectors provided on the helicopter at predetermined positions for directing light to be picked up by the cameras for determining the helicopter's position.

These proposals suffer from a number of deficiencies. By mounting the cameras as proposed above, reflections of sunlight or illuminating lights from the front windshield and other glass windows and the body of the aircraft will be picked up by the cameras and transferred to the remainder of the video system causing confusion when the signal(s) received is (are) used to determine the aircraft's position.

Additionally, because the cameras are mounted remote from the landing position of the aircraft, as the aircraft descends to its landing position, the error never approaches "0" in the calculations.

It is therefore an object of this invention to provide improved systems and components therefor suitable for use in landing aircraft on the ship deck.

It is a further object of this invention to provide improved landing and securing systems suitable for use for landing and securing an aircraft landing on the deck of a ship.

It is a further object of the invention to provide improved components suitable for use with such systems.

Further and other objects of the invention will be realized by those skilled in the art from the following summary of the invention and detailed description of embodiments thereof.

SUMMARY OF THE INVENTION

According to one aspect of the invention, an improved system suitable for use in landing a craft, for example an aircraft (for example, helicopter, RPV, VTOL) on for example shipboard is provided for example comprising a support, base, platform or housing (in one embodiment being reciprocal from remote a landing area on the deck of a ship to a position proximate the landing area), the support, base, platform or housing carrying an upwardly directed radiation sensor for example a light sensor (for example, a camera, e.g. video camera) for example being directed generally vertically and means for securing the craft (for example aircraft) to the support, housing, base or platform.

According to another aspect of the invention, the support base, platform or housing also comprises a pulse detector preferably in close proximity to the upwardly directed light sensor. In one embodiment it may be embodied within the light sensor.

The light sensor preferably will sense light between the infrared end of the spectrum and ultraviolet end of the spectrum.

According to another aspect of the invention, the aircraft carries at least one emitter of light and preferably on the underside thereof (for example, an active emitter such as a beacon, preferably an array (for example a string) of beacons, which each may emit a continuous light beam or which beam may be pulsed mounted on the underside of the aircraft). Preferably, the light emitter is a point source of light (for example 30/1000") and the emitter preferably emits a narrow band at a predetermined frequency or wavelength, for example 800 nanometers. The light emitter (e.g. beacon) preferably emits a signal between the infrared and ultraviolet regions. Preferably the aircraft carries a string of emitters (for example at least three beacons in a row). In another embodiment, the array may comprise four emitters.

According to another aspect of the invention, the emitters are pulsed emitters (for example pulsed emitters synchronized to the exposure of the light sensor (e.g. camera)) or the camera synchronized to the frequency of the emitter.

According to another aspect of the invention, the radiation sensor (for example light sensor) may be shuttered thereby reducing camera blooming.

According to another aspect of the invention, the radiation sensor for example light sensor (for example camera) may comprise a pair of band-pass filters, one filter before the lens of the sensor and one after the lens. In one embodiment the filters each pass the identical wavelength of light at its center but which each need not have the same band width as the other. With the emission of a narrow band wavelength of light by the emitters, corresponding to the "center" wavelength of the lens filters, the light energy passing through the filters through the video system is confined to the narrow band. Thus the amount of solar energy entering the sensor (camera) passing through the filters is substantially reduced, reducing the effect of sunlight on the sensor and system.

The radiation sensor (for example light sensor) may be a Charge Coupled Device (CCD), for example TIES 560 from Nippon Electric Company (NEC) or Charge Injection Device (CID), Model 2500 from General Electric Company.

Where the emitters are mounted on the underside of the aircraft in string formation for example, the system including the light sensor easily picks out the beacons because (a) the sun is blocked out by the underside of the aircraft and (b) the sun in the field of the camera will appear larger (with whatever light passes through the filters) than the point sources of the emitters ($<30/1000"$).

Where a string of beacons is provided on body of aircraft, for example side or front, if the beacons are appropriately spaced from one another and the sensor (camera) is provided on for example the face of the hangar, the sun will only obliterate one beacon at a time, if any beacons are obliterated.

According to another aspect of the invention, one sensor is mounted for example on the ship. Thus, according to another aspect of the invention, an improved system suitable for use in landing a craft (for example an aircraft e.g. a helicopter, VTOL and RPV) for example on shipboard is provided comprising at least one radiation (for example light) sensor mounted in one embodiment on the ship and the aircraft comprises at least one emitter for example an array (for example string) of emitters. According to another aspect of the invention more than one sensor is provided for example mounted on the ship.

The image received by the sensor (for example video camera) may be digitized and sent to an image processor in the system. The image processor then may compute the position of the beacons in the image field. The processed information may then be used to assist for example a pilot in bringing his helicopter or VTOL to a safe landing and to position a rapid securing and traversing system for example disclosed in U.S. Pat. No. 4,786,014 which is hereby incorporated by reference in the position expected to be the landing position of the helicopter for immediate securing of the helicopter upon landing or to assist the landing of an RPV.

Therefore, according to another aspect of the invention, an improved securing and traversing system for assisting to land a helicopter and securing a helicopter carrying a probe upon landing on the deck of a ship for subsequently traversing it from its landing position, said system comprising a housing reciprocal from a position remote the landing area to a position adjacent the landing area of the helicopter, the housing carrying an upwardly directed light sensor (for example a video camera) for sensing light (for example from emitters, e.g. beacons mounted on the helicopter), a shock absorber and sensing means extending across the housing for contacting a probe or other projection extending from the helicopter on the exterior of the helicopter when the helicopter has landed on the deck of the ship and the housing is brought to engage the probe or other projection, the shock absorber and sensing means for slowing and stopping the movement of the housing when the probe or projection is engaged and for cushioning the engagement and for sensing the position of the probe or projection, means for reciprocating the housing towards and away from the landing area, a carrier on the housing extending across the housing and carrying securing means thereon for securing the housing to the probe or projection on the helicopter, the securing means being normally secured at one side of the housing on the carrier and being moved laterally along the carrier across the housing when the carrier is activated to capture the probe or projection, and means to operate the carrier whereby when the probe or projection engages the shock absorber and sensing means, the impact of the probe is cushioned and the position of the probe or projection is sensed relative to the mouth of the securing means whereby when the sensor receives signals from the emitters on the helicopter and the signals are used to locate the helicopter relative to the ship deck, the signals are used to assist to determine the landing position of the helicopter, and position the securing and traversing system proximate such landing position whereby when the helicopter has landed the probe on the helicopter is sensed as positioned in line with the mouth of the securing means, the carrier moves the securing means to grasp and secure the probe or projection and when the probe is sensed not to be appropriately positioned, the system is activated to cause the helicopter rapid securing system to be appropriately positioned relative to the probe.

According to another aspect of the invention, the shock absorber and sensing means are incorporated in one structure to stop the probe in a position along the centre line of the mouth when the housing is slowed up and stopped and permitting the carrier to move the securing means laterally across the housing to capture the probe.

According to another aspect of the invention, the shock absorber and sensing means are different structures.

In one embodiment the helicopter securing and traversing system is provided for securing a helicopter upon landing on the deck of a ship and for subsequently traversing it from its landing position, said system comprising a housing reciprocal from a position remote the landing area to a position adjacent the landing area of the helicopter, the housing carrying an upwardly directed light sensor (for example a video camera) for sensing light from a helicopter (for example from light emitters, e.g. beacons) and a shock absorbing bar extending across the housing from one side to the other normal to the direction of movement of the housing for contacting a probe or other projection extending from the helicopter on the exterior of the helicopter when the helicopter has landed on the deck of the ship and the housing is brought to the probe or other projection, the shock absorbing bar being depressed towards the housing opposite the direction of movement of the housing upon engaging the probe or projection to slow and stop the movement of the housing and cushion the impact of the probe or other projection, means for reciprocating the housing towards and away from the landing area, a carrier on the housing extending parallel to the shock absorbing bar, the carrier for securing means thereto for securing the housing to the probe or other projection on the helicopter, the securing means being normally secured at one side of the housing on the carrier and being moved when the carrier is activated, laterally across the housing to capture the probe or projection, the securing means carrying a laterally opening mouth opening in the direction across the housing towards the probe and the other side of the housing, sensing means for sensing the position of the probe relative to the mouth of the securing means for sensing when the mouth is appropriately aligned with the probe so that when the securing means is moved by the carrier, the securing means will grasp and secure the probe and for sensing when the probe has moved away from the sensing means whereupon the system is activated to appropriately position the helicopter rapid securing system and thus the securing means relative to the probe or other projection, and means to operate the carrier.

In one embodiment the shock absorber and sensing means are incorporated in one structure to stop the system in a position wherein the probe is along the centre line of the mouth when the housing is slowed up and stopped and permitting the carrier to move the securing means laterally across the housing to capture the probe.

In one embodiment the carrier is a lead screw extending across the housing.

In another embodiment the carrier is a hydraulically driven or electrically driven chain drive.

According to another aspect of the invention, a capturing, securing and traversing system for an RPV carrying light emitters suitable for use on shipboard is provided, the system comprising a support or platform comprising an upwardly directed light sensor (for example a video camera) and a plurality of slots (preferably extending radially towards the center of the platform), each slot carrying a vertically extending arm moveable in the slot carrying means (for example a laterally extending finger) for securing to the support (for example bottom ring or legs of the RPV) when moved radially towards the center and means for moving the arms in the slots (for example a lead screw operated by a motor and gears) whereby detection of the emitters carried by the RPV by the light sensor permits the RPV to be landed on the platform and the moving of the arms after the means on the arms engage and secure the support (for example, the legs or ring) to the system can be used to cause the RPV to be moved to center the RPV on the platform.

According to another aspect of the invention, a capturing, securing and traversing system for an RPV carrying light emitters suitable for use on shipboard is provided, the system comprising a platform, comprising an upwardly directed light sensor (for example a video camera) and arms extending from the side of the platform, the arms being raised and retractable into and extendable from, the sides of the platform, each arm comprising fingers from the top of the arms for clamping the support of the RPV whereby detection of the emitters carried by the RPV by the light sensor permits the RPV to be landed on the platform and where the RPV is supported on a pair of parallel skids, the arms may be extended laterally from the platform prior to the landing of the RPV and after the RPV has landed, the arms are retracted causing the arms to be retracted with the fingers overlying the skids.

BRIEF DESCRIPTION OF THE DRAWINGS

The invention will now be illustrated with respect to the following drawings illustrating embodiments of the invention in which:

FIG. 11 is a sectional view through the alternate securing system shown in FIG. 10.

FIG. 12 is a close up of a portion of another embodiment of the probe shown in FIG. 11.

FIGS. 13 and 14 illustrate the relative positions of the two grids of the platform used to secure the probe.

FIG. 15 is a top view of the landing grid.

FIG. 18 illustrates schematically a system used for determining the position of an aircraft.

FIG. 18A illustrates schematically part of the system of FIG. 18.

FIGS. 19 and 20 are side exploded views of optical element arrangements of light sensors suitable for use in the system.

FIG. 21 illustrates schematically the arrangement of other elements used with the optical element arrangements of FIGS. 18, 19 and 20.

FIGS. 23 illustrates another embodiment.

DETAILED DESCRIPTION OF PREFERRED EMBODIMENTS OF THE INVENTION

Figure 1:
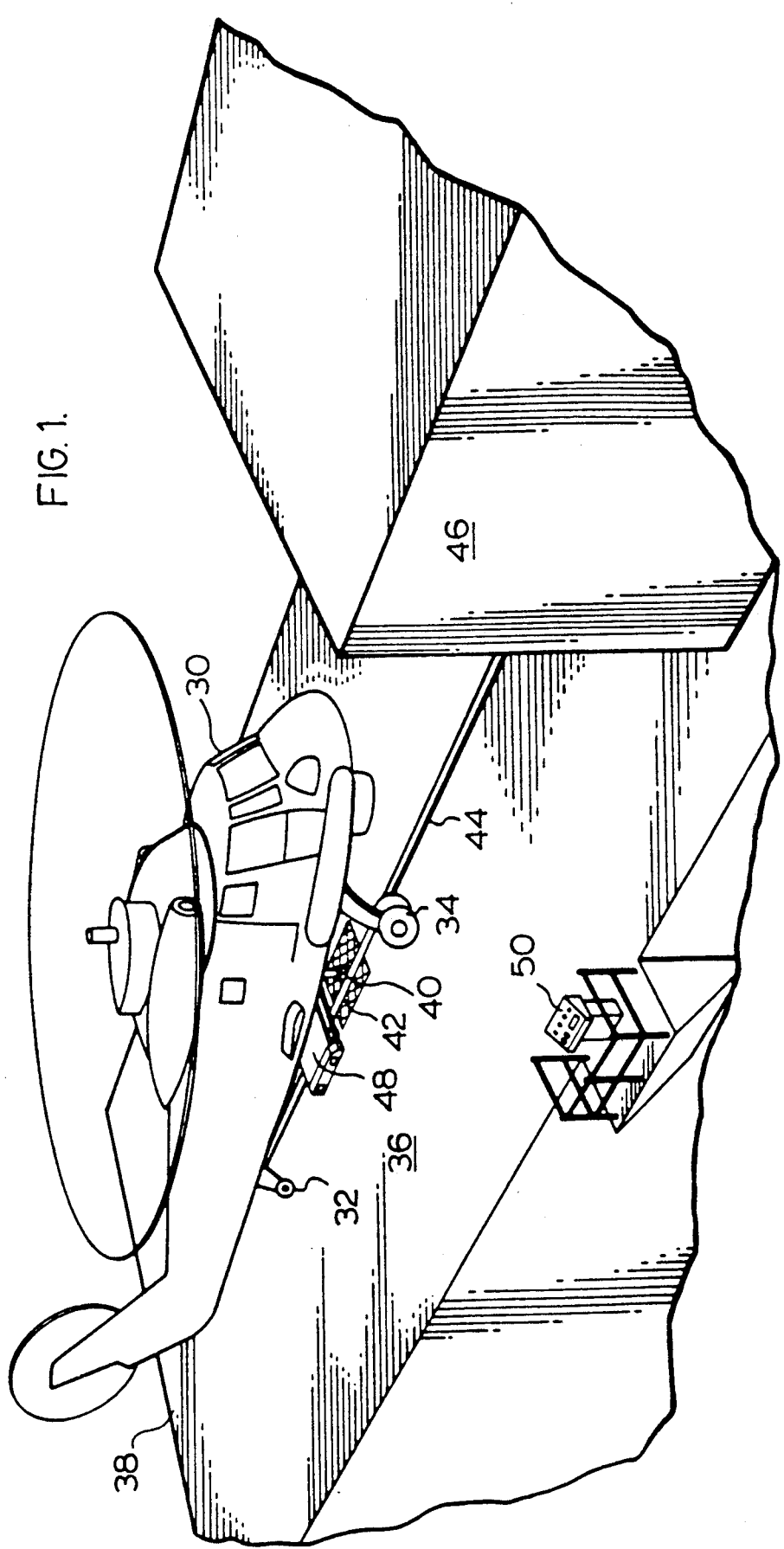
FIG. 1 is a perspective schematic view of a helicopter landing on a frigate incorporating a helicopter rapid securing and traversing system according to a preferred embodiment of the invention.

With reference to FIG. 1, Sea Hawk Helicopter 30 comprising a free wheeling rear wheel 32 and a pair of forward dual wheel units 34 on either side below and near the nose has landed on deck 36 of frigate 38 with probe 40 in landing area 42 through which track 44 passes from the rear of the frigate to the hangar. The deck 36 supports a hangar 46 into which the helicopter 30 when secured to traversing system 48, will be traversed along track 44. Deck 367 also supports a control console 50 for controlling the traversing system 48 and the components thereof.

Figure 2:
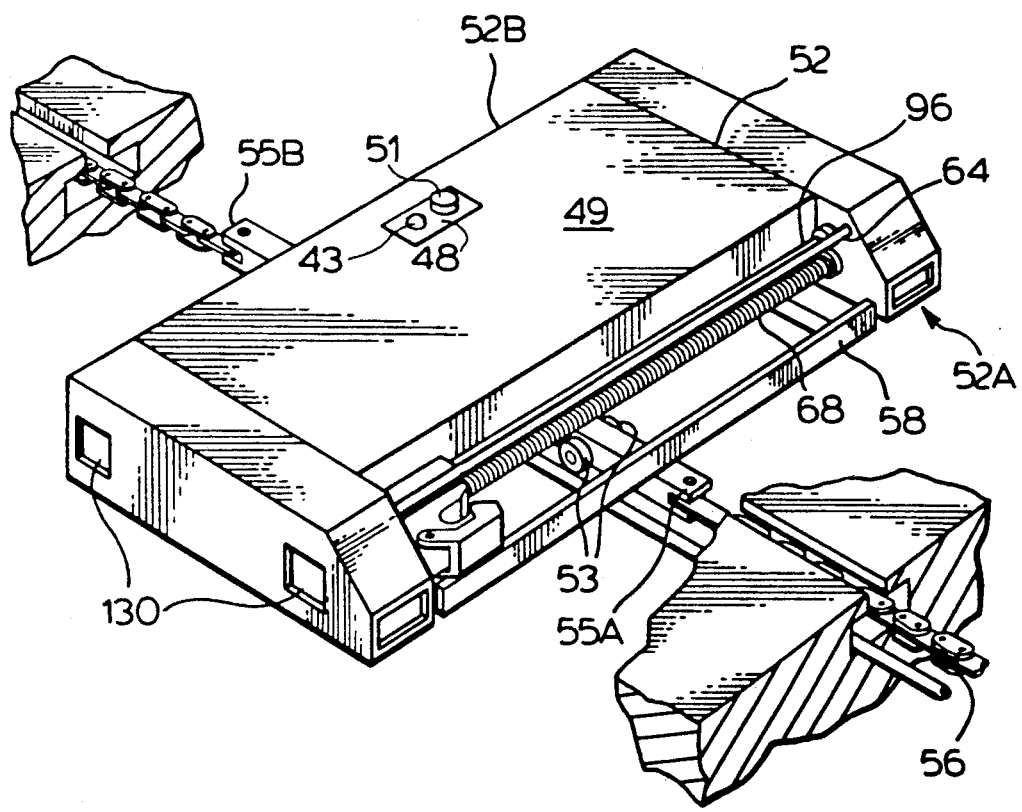
FIGS. 2 and 2A is a view partly in section illustrating part of the helicopter rapid securing and traversing system of FIG. 1.
Figure 2A:
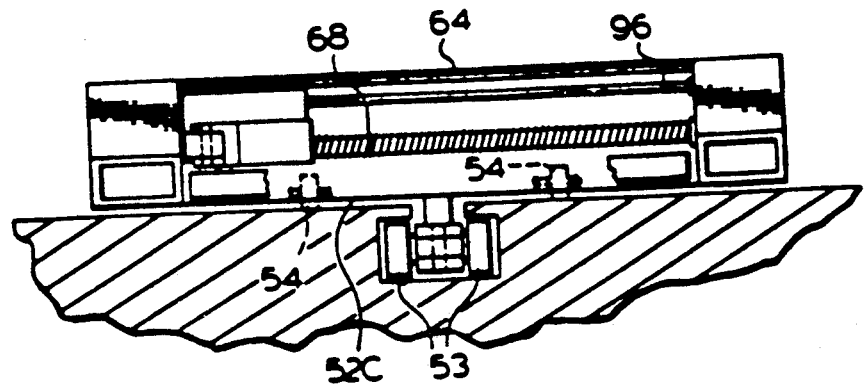

With reference to FIGS. 2, and 2A securing and traversing system 48 comprises a housing 52 having forward end 52A and rear end 52B. Housing 52 carries downwardly extending casters 54, for riding on deck 36 and supporting the securing system 48 for movement on the deck and rollers 53 carried by the bottom of housing 62 and pinned at 55A and 55B to chain or cable 56 passing through track 44.

Figure 3A:
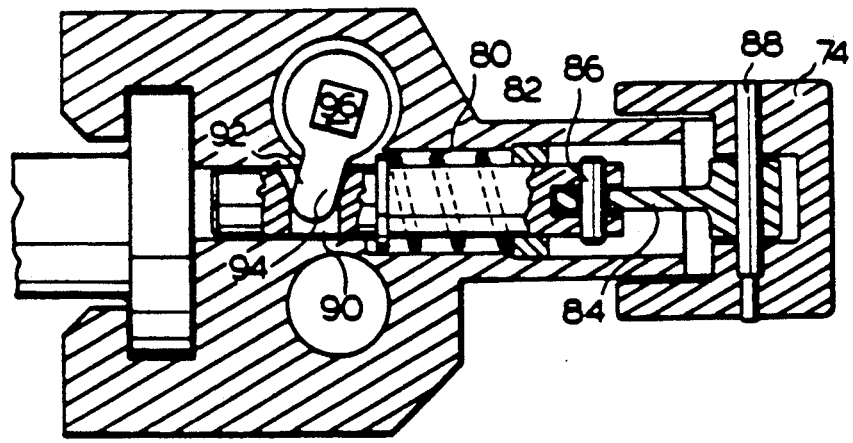
FIGS. 3 and 3A is a schematic view of the component parts of the rapid securing and traversing system of FIGS. 1 and 2.
Figure 3:
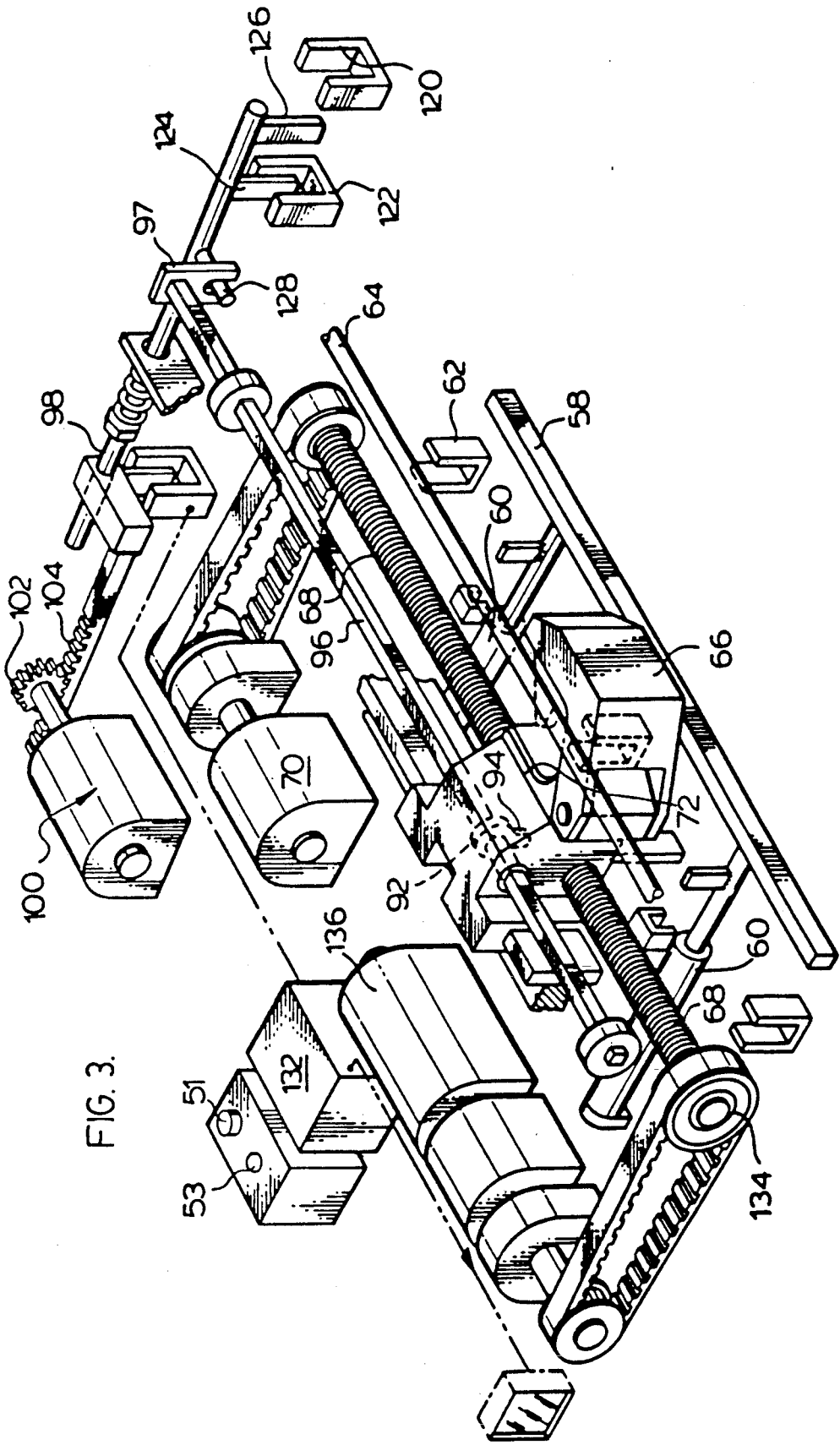

With reference to FIG. 3, securing and traversing system 48 comprises at the front 52A of housing 52 leading shock absorber bar 58 moveable against shock absorbing cylinder 60 as the securing and the traversing system 48 is moved towards and engages the probe 40 for absorbing the shock of the bar 58 engaging the probe. As the cylinders absorb the shock, proximity solid state switches 62 (Hans Truck GmBH & Co. Witz-/ebenstr. 7. D-4330, Mulheim/Ruhr, West Germany Model Bi 10-S30-AZ3X) are engaged by bar 58 and which slow and ultimately stop the movement of the chain 56 and thus the system 48. After the probe engages shock absorbing bar 58, it next engages sensing bar 64 which when engaged, causes the probe to be positioned on the center line of the mouth of securing means 66 forming part of system 48 for securing the probe 40 to the system 48. When the probe 40 is aligned on the center line of securing means 66 as sensed by sensing bar 64, lead screw 68 (SKF SRWA 39-25R Planetary Roller Screw) (See FIG. 3) extending across the front 52A of the housing 52, is rotated at high speed by 2 horse power high speed motor 70 (Boston Gear-BKVTF-B) moving securing means 66 along lead screw 68 capturing probe 40. The time for capture is in the order of 1½ to 2 seconds. Where the probe (for whatever reason) moves away from the sensing bar 64, the system is activated to cause movement of system 48 to bring sensing bar 64 into contact with probe 40. Where the securing means 66 has been started along lead screw 68 prior to the probe 40 engaging sensor bar 64 (as controlled by a track system [not shown]), the securing means 66 moves the remaining distance along the lead screw to capture probe 40.

Proximate rear end 52B, and, centrally mounted on the top 49, of housing 48 is upwardly directed video camera 51 and upwardly directed pulse detector 53 forming part of a system used to assist the landing of helicopter 30 on shipdeck 36.

With reference to FIG. 3, rod 96 is secured to plate 97 to be engaged by actuator 98 (SKSF Linear Actuator-CARR 32×100×21E 110cB) which rotates plate 97 by motor 100 rotating pinion 102 riding in rack 104 moving rack 104 and thus actuator 98 to rotate plate 97 and thus rod 96.

As will be seen in FIG. 3, proximate switches 120 and 122 are provided for engagement with and/or detection of one of flags 124 and 126 as rod 96 rotates plate 97. Thus, where after the follower 94 is rotated, rod 96 rotates plate 97 and thus projection 128 away from switches 122 and 120 (model NI 10-K20-AZ3X from Hans Truck GmBH & Co. KG) positioning flag 124 in detecting position with respect to switch 122. Thus securing means 66 may be signaled close on probe 40 when the securing means is closed, and proximity switch 122 detects flag 124, switch 122 de-energizes motor 70 (but leaves it free-wheeling), turns on lights 130 [see FIG. 4 through machine intelligence means 132 (Sequence Logic Actuator) (see FIGS. 3 and 4)] and engages clutch 134 for connecting lead score 68 to slow speed high torque motor 136 (Parallel [helical] gear 2 horse power motor by EurodriveOR60-DT90L-BHP). When clutch 134 is engaged (with Motor 70 free-wheeling), slow speed motor 136 is connected to lead screw 68. Thus, screw 68 may be turned slowly by motor 136 for maneuvering the helicopter once secured for aligning the helicopter by moving securing means 66 back and forth along lead screw 68 on the track securing, and as the traversing system 48 is appropriately positioned on the ship deck 36, to bring rear castering wheel into line with track 44 until the helicopter 30 is aligned for traversing;

As is apparent when the helicopter 30 is to be launched, the helicopter may be removed from hangar 46 and moved to a launch position by the securing and traversing system 48 and the wheels 32, 34 of the helicopter 30 properly positioned for launch, the securing means 66 must be opened to release the probe 40. As best seen in FIGS. 3 and 3A, in this regard, activator 98 is caused to rotate plate 97, rod 96 and follower 92 causing a shaft 82 to push a plate 84 pushing an arm 74 away from body 72 opening securing means 66 wider than probe 70. In that event, flags 124 and 125 are moved towards proximity switch 120 so that flag 126 is detected by proximately switch 120. In this event, the lights 130 are turned off, the clutch 134 is disengaged and motor 70 is once again activated to cause securing means 66 to be retracted quickly from probe 40 by lead screw 68 for launch purposes. Indicator means (for example, lights) can be provided to indicate the securing means 66 has been retracted from probe 40.

Figure 4:
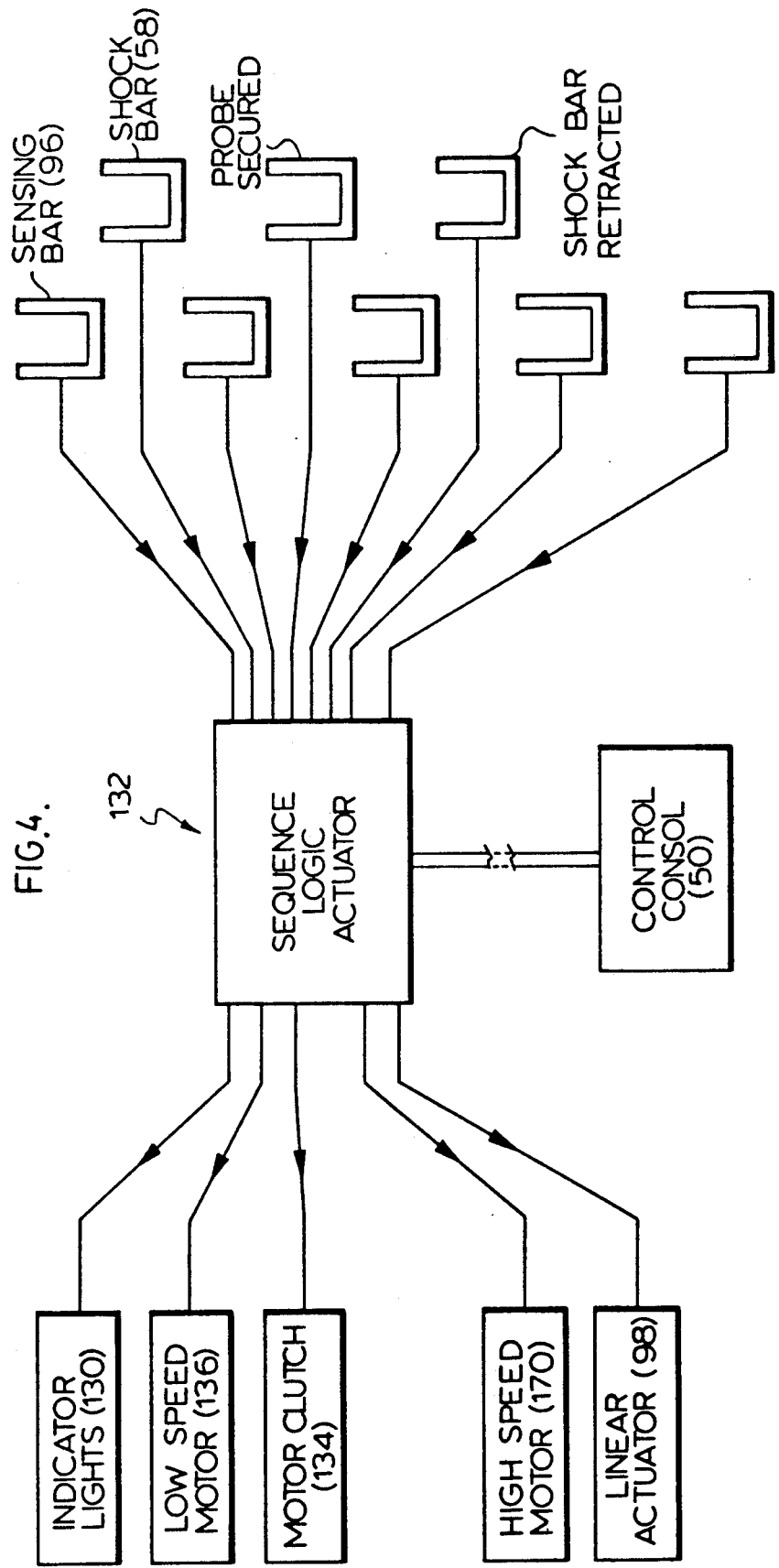
FIG. 4 illustrates the use of machine intelligence means to operate the system of FIG. 3.

With reference to FIG. 4, machine intelligence means 134 (Sequence Logic Actuator) is secured to the control console 50 (see FIG. 1) and is connected to the various components in the system 48 (see FIG. 4) to detect their relative positions, and their actuation.

Figure 5:
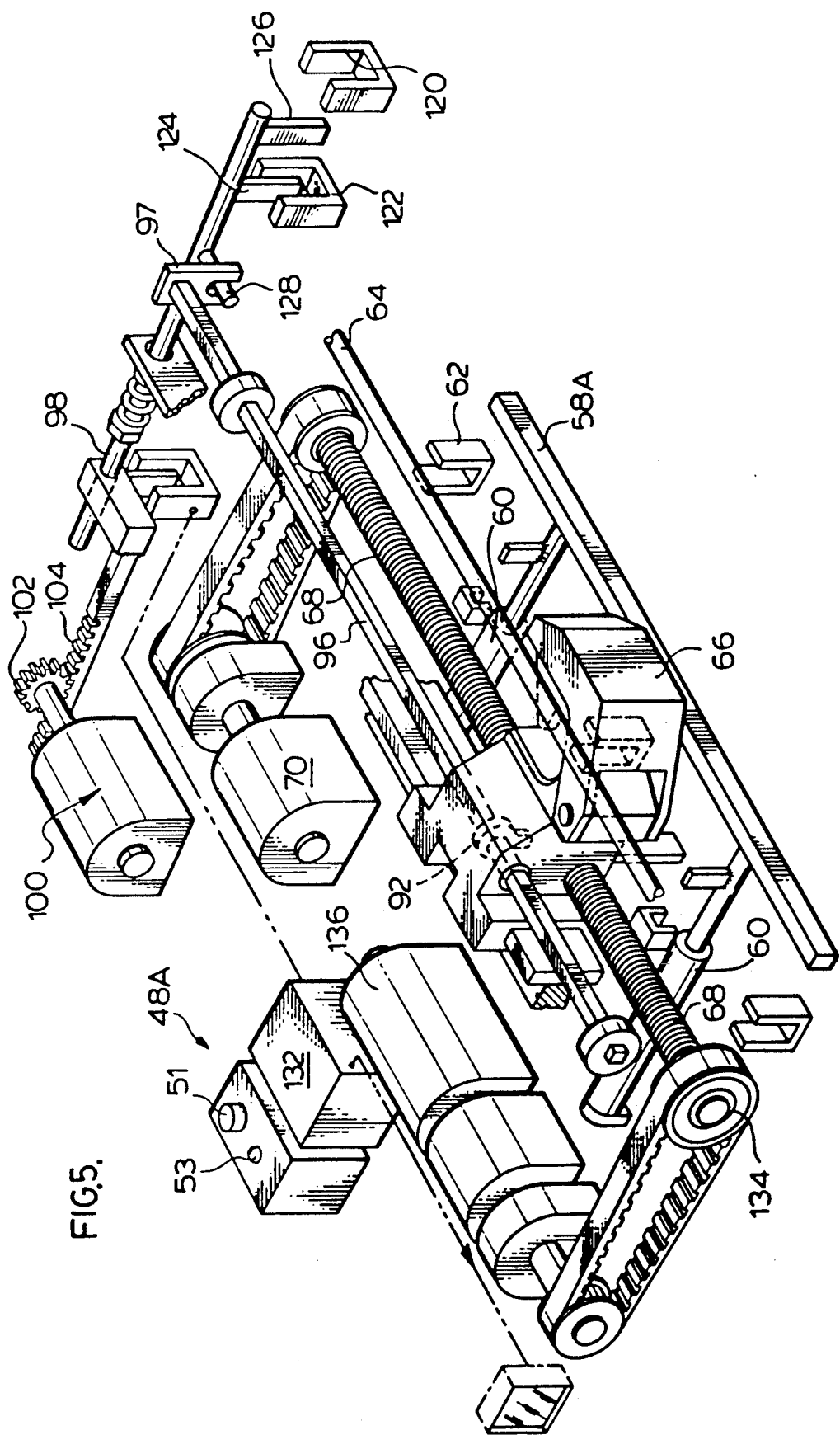
FIG. 5 is a schematic perspective view of the component parts of another rapid securing and traversing system constructed according to another embodiment of the invention.

With reference to FIG. 5, securing and traversing system 48A is shown constructed substantially the same as securing and traversing system 48 shown in FIG. 11 except that shock bar 458 and sensor bar 64 have been combined into bar 58A which combines the abilities for both bars 58 and 64.

Figure 6:
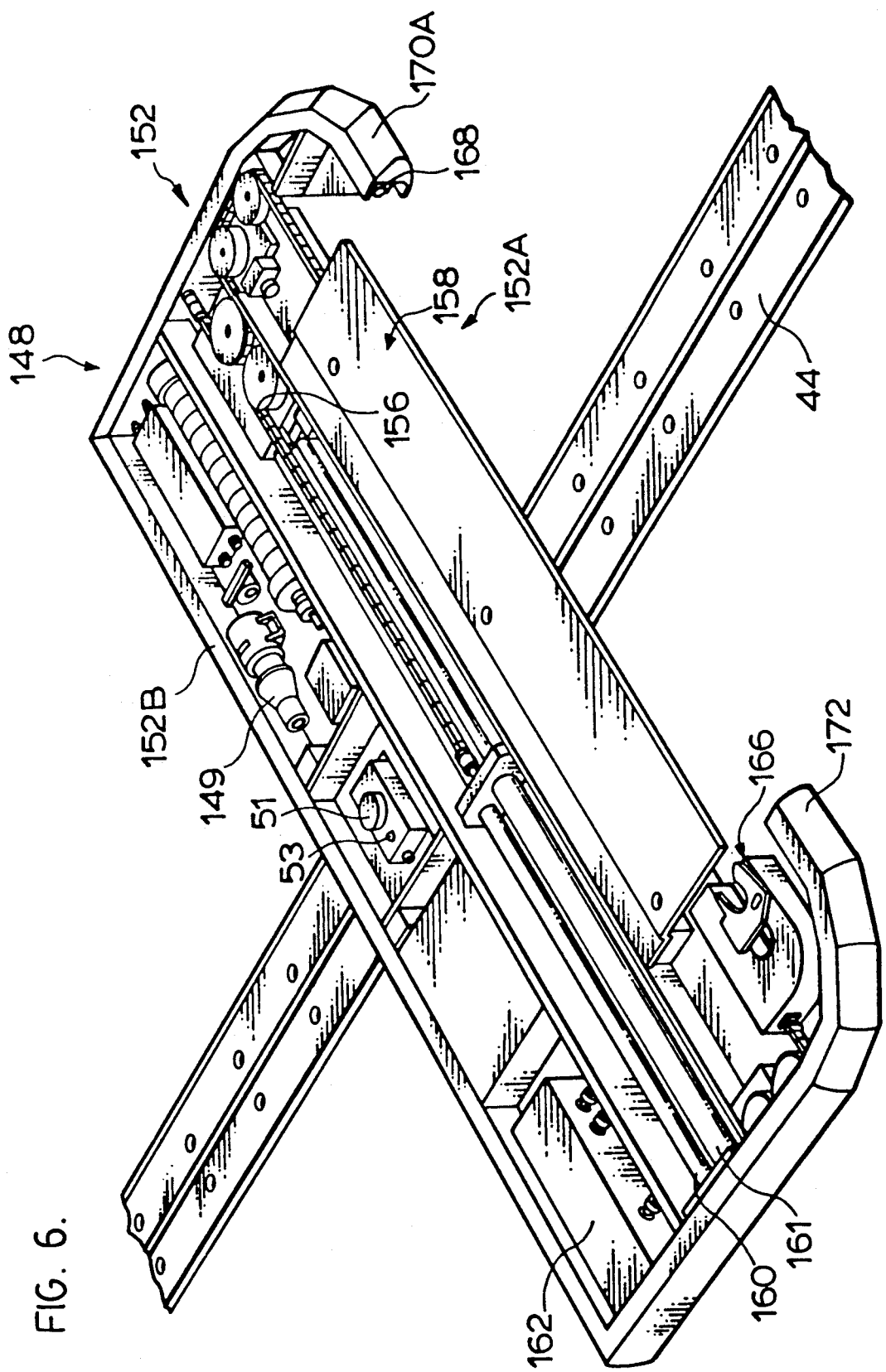
FIG. 6 is a perspective view illustrating part of another helicopter rapid securing and traversing system.
Figure 7:
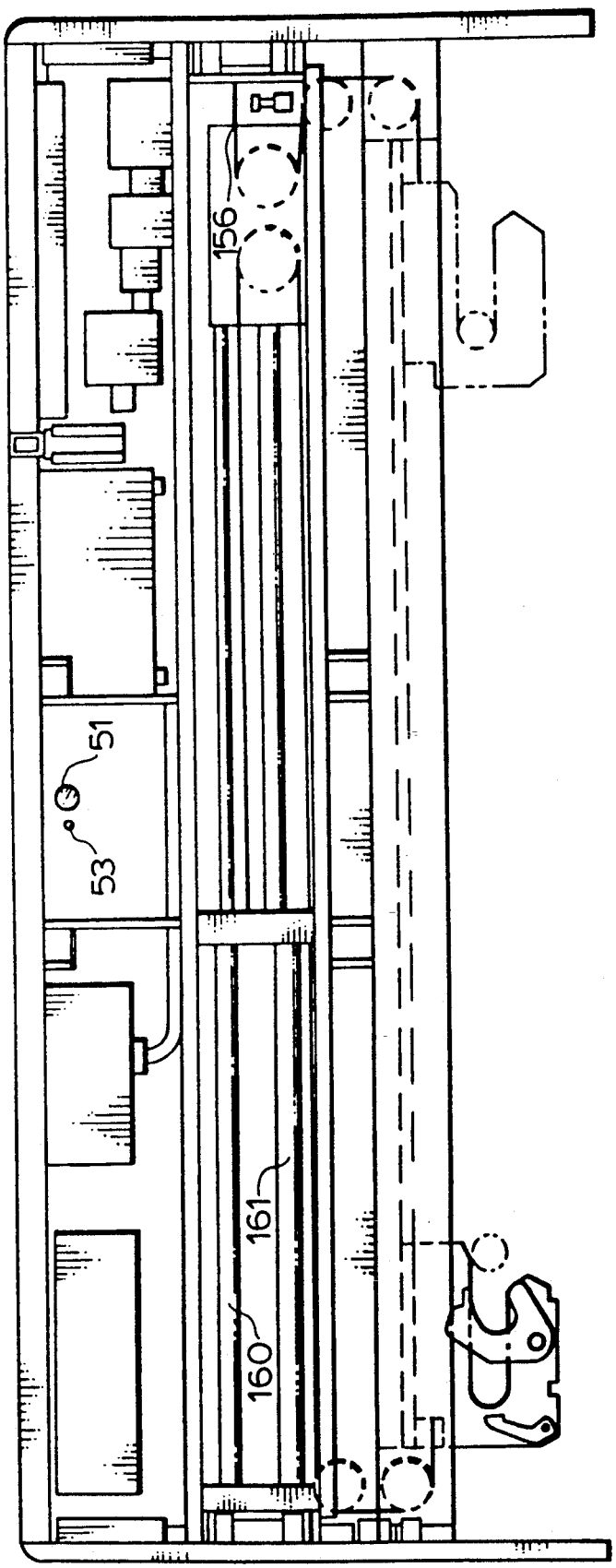
FIG. 7 is a top plan view illustrating components making up the helicopter rapid securing and traversing system of FIG. 6.

With reference to FIGS. 6 and 7 securing and traversing system 148 comprises at the front 152A of housing 152 leading shock absorber bar or shock plate 158 (also incorporating sensing bar 64) movable against shock absorbing cylinder as the securing and traversing system 148 is moved forward and engages the probe 40 of the helicopter 30 for absorbing the shock of the bar 158 engaging the probe. As the cylinders absorb the shock proximity solid state switches (Hans Truck GmBH & Co. Witz/ebenstr. 7. D-4330, Mulheim/Ruhr, West Germany Model Bi 10-S30-Az3X) are engaged by bar 158 and which slow and ultimately stop the movement of the chain 156 and thus the system 148. After the probe 40 engages shock plate 158 causing the probe 40 to be positioned on the center line of the mouth of claw or securing means 166 forming part of the system 148 for securing the probe to the system 148. When the probe is aligned on the center line of securing means 166 as sensed by the plate 158, chain drive 156 extending across the front 152A of the housing 152 is caused to drive securing means or claw 166 at high speed by high speed hydraulic cylinder 160 for capturing the probe. The time for capture is in the order of 1½ to 2 seconds.

Where the probe (for whatever reason) moves away from the plate 158 the system is activated to cause movement of the system 148 to bring plate 158 into contact with the probe. Securing means or claw 166 is activated by chain drive 156 operated by high speed cylinder 160 controlled by hydraulic manifold 162. Securing means 166 can also be started by chain drive 156 through the activation of cylinder 160 prior to shock plate 158 engaging probe 40 as controlled by the tracking system (see FIG. 18). In this regard centrally mounted upwardly directed video camera 51 and upwardly directed pulse detector 53 forming part of the system shown in FIG. 18 are used to assist the landing of a helicopter 30 on to the shipdeck 36.

When the securing means 166 grasps the probe and the appropriate proximity switches are activated, cylinder 160 is deactivated and cylinder 161, a slow speed cylinder, is activated for maneuvering. Thereafter chain 56 may be driven slowly for maneuvering the helicopter by moving securing means 166 back and forth on the track to position the rear wheel of the helicopter 30 into line with track or deck guide rail 44.

As is apparent, system 148 has also been modified to provide a beam 168 passing from arm 170A to other arm 172 to indicate to the system when the probe is about to engage shock plate 158. As is also apparent to a man skilled in the art, the appropriate electrical equipment and hydraulic equipment is provided for the operation of cylinders 160 and 161 for driving chain 156. As previously with reference to FIG. 4, machine intelligence means 134 (Sequence Logic Actuator) is secured to the control console 50 (see FIG. 1) and is connected to the various components in the system 148 except that low speed motor 136 is replaced by cylinder 161 and high speed motor 170 is replaced by cylinder 160. Other modifications have also been made to permit the system to be used with the hydraulic components.

Figure 8:
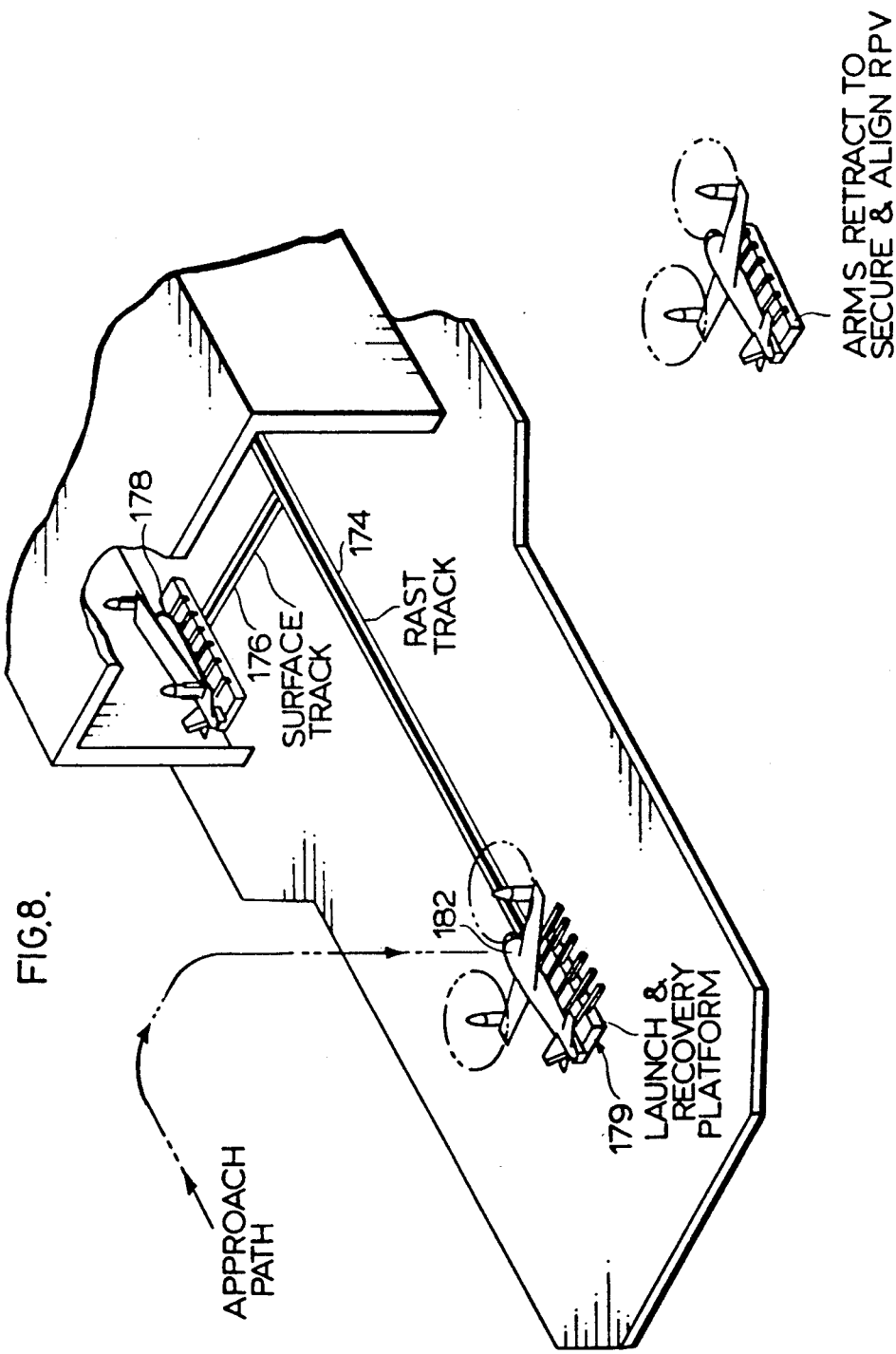
FIG. 8 is a schematic illustrating a system for securing, traversing and handling an RPV.

With reference to FIG. 8, a launch and recovery platform 179 is provided on which the RPV 182 is landed and moved along a RAST track which is permanently mounted in shipdeck 174 for storage in the hanger. When it reaches surface track 176, it may then be moved laterally, disassembled and put in its storage position at 178.

Figure 9:
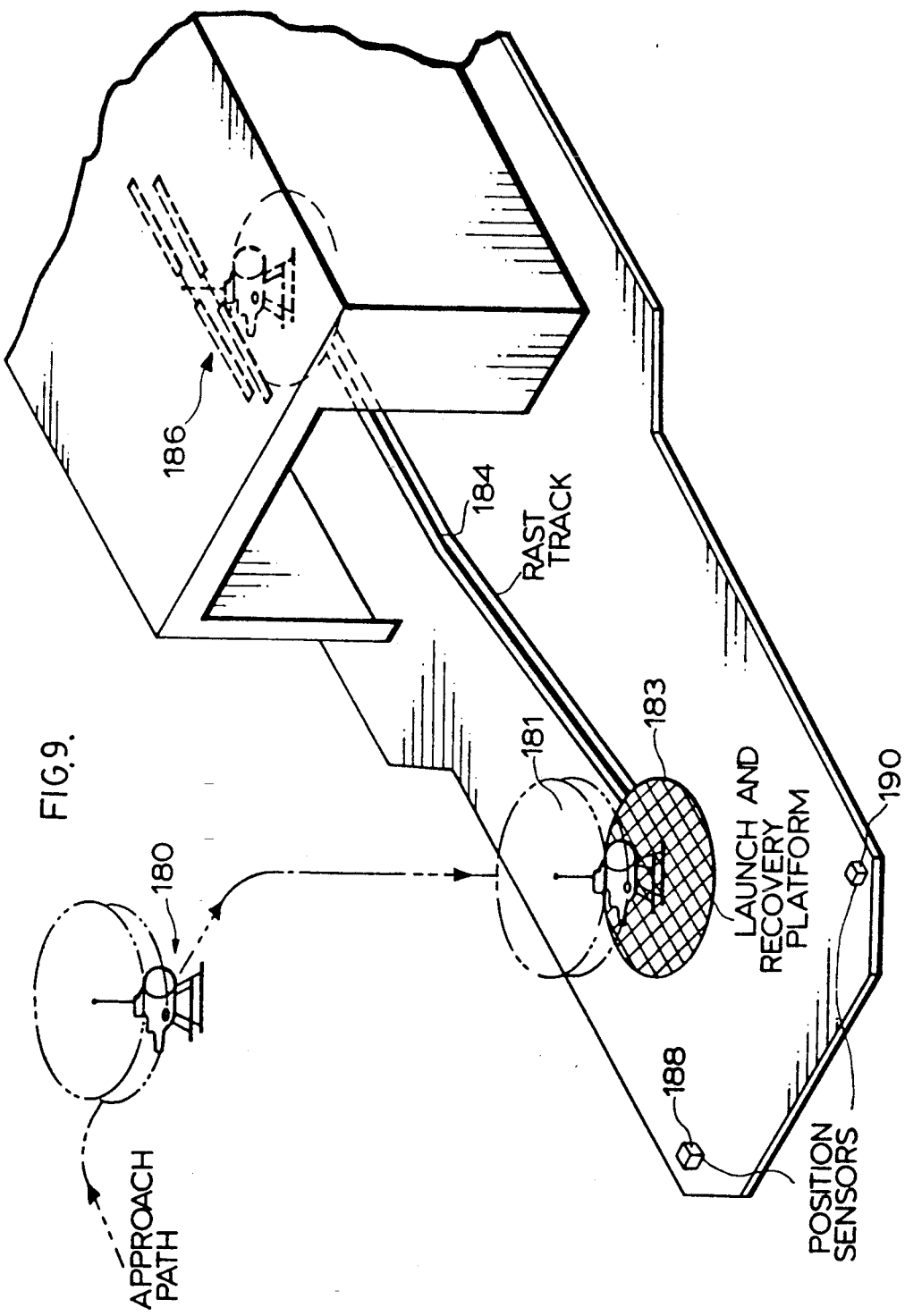
FIG. 9 illustrates a further system.

With reference to FIG. 9, the RPV 181 lands on a launch and recovery platform 183 which is moved along RAST track 184 into hangar 186. Position sensors 188 and 190 have been provided to assist the operator to determine the relative position of the RPV relative to the launch and recovery platform 183.

Figure 10:
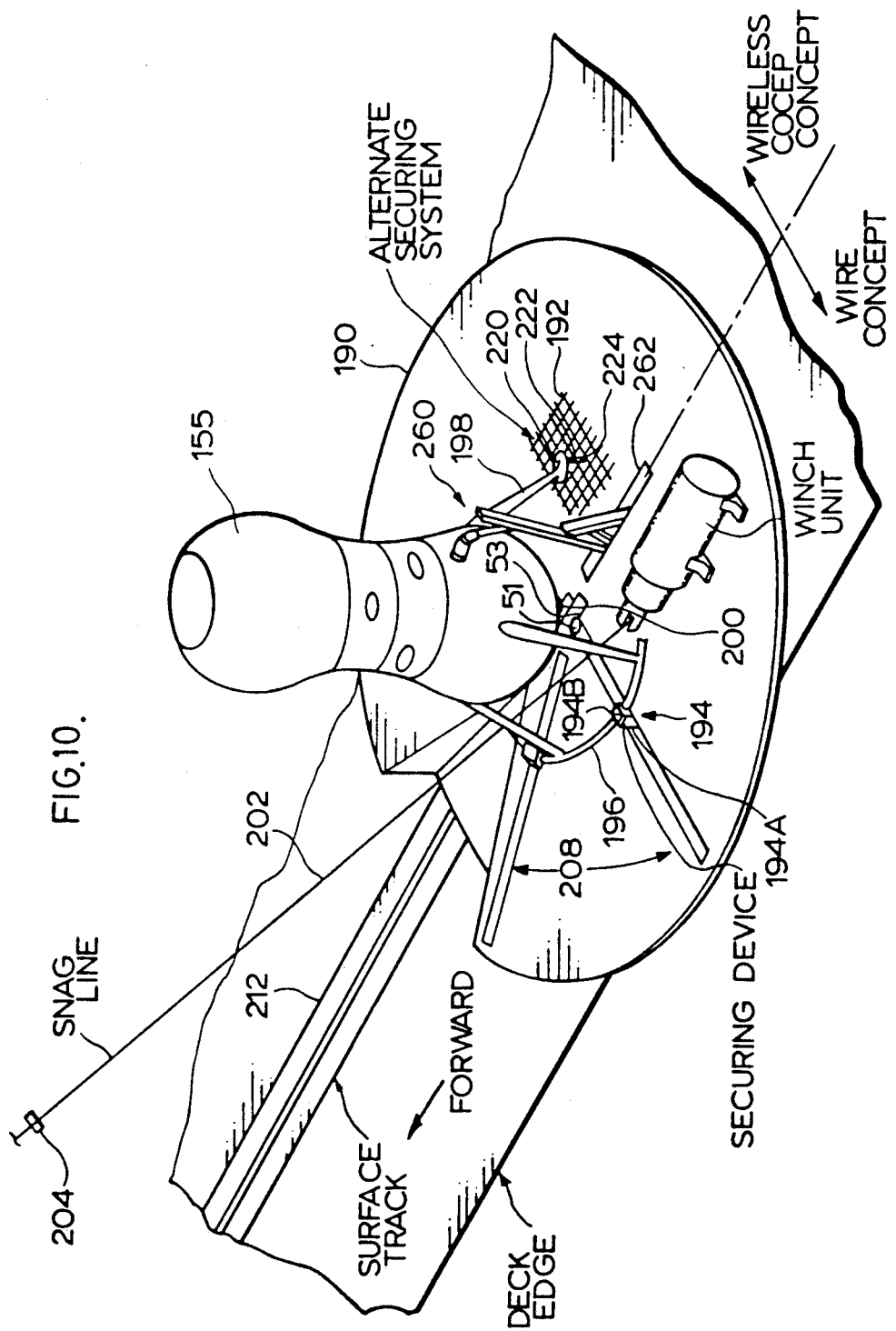
FIG. 10 is a schematic of two securing systems used to secure an RPV.

With reference to FIG. 10, RPV 155 is shown on a launch recovery platform 190, split to show two alternative securing systems 192 and 194 for the legs 198 and ring 196 under carriage support respectively. Granulated winch drum 200 carries snag line 202 which extends to a fitting 204 of the ship and is used to snag a line from the RPV by means not shown on an end which is secured into the drum 200. Winch drum 200 is operated by an eddy current clutch system within winch 258.

System 194 for securing ring 196 consists of a series of vertically extending arms 194A and laterally or horizontally extending fingers 194B secured to move in radially extending slots 208 driven by lead screws (not shown). As is apparent, arms 194A and transverse portions 194B comprise clamping fingers which are driven by lead screws towards and away from the center of platform 190 for clamping over ring 196 and securing the RPV to the platform. Additionally, by simultaneously synchronizing the movement of each of the lead screws provided for each arm 194, the RVP 155 can be moved and centered on the surface of the platform.

With reference to FIG. 10, surface mounted track 212 comprises a cable secured or pinned to platform 190 for the movement of platform 190 along surface track 212 from a launch and recovery position to a standby position or into a stored position in the hangar.

The alternative system securing the legs 198 of the RPV 52 consists of a probe-type attachment on each leg comprising pad 220 on the underside of which projects downwardly extending probe 222 having on the bottom thereof an enlarged portion 224. System 192 comprises a parallel extending pair of grids (see FIGS. 13 and 14) overlying one another, each grid comprising crossed wires or cables 224 and 226. The upper grid is passive and is identified as 228 and the lower grid is identified as 230 (see FIG. 11) and is moveable (ether by rotation or translation). Thus, it is apparent with reference to FIG. 13 as probe 222 enters a space between crossed cables 224 and 226 of both upper grid 228 and lower grid 230 and lower grid is then moved (either rotated or translated laterally) (see FIG. 14). It is apparent that probe 222 is captured by being clamped between cables of both upper grid 228 and lower grid 230 and the space therebetween is not large enough to permit the bulbous end 224 to pass between the cables clamping probe 222 securing each of the legs through the grid systems.

With reference to FIG. 10, umbilical connection and release mechanism 260 and the additional electrical units for engine start sequencing project through slot 262 of platform 190 is shown. Centrally mounted on platform 190 are video camera 51 and pulse detector 53. Centrally mounted on platform 179 (see FIG. 8) and recovery platform 183 are a video camera (not shown) and a pulse detector (not shown).

Figure 16:
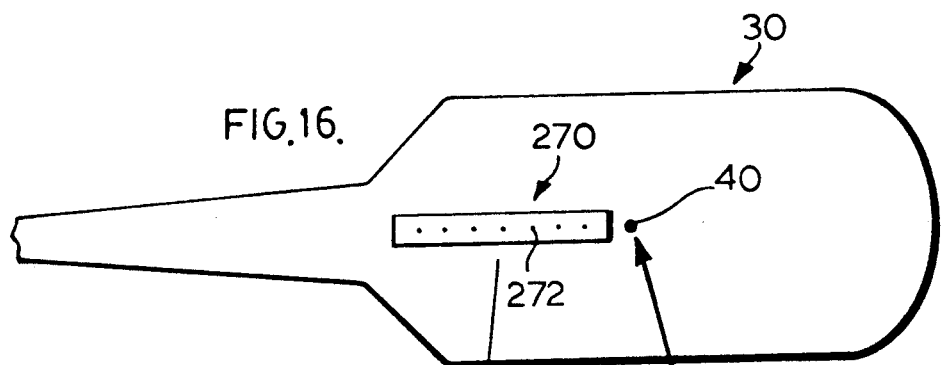
FIGS. 16 and 17 illustrate diagrammatically the disposition of beacons and probe on the underside of two helicopters.

With reference to FIG. 16, there is shown the underside of helicopter 30 carrying probe 40 and an array or string 270 of infrared emitting beacons 272 are disposed in a line extending rearwardly from proximate probe 40. The beacons 272 are each separated from one another by about a foot between respective beacons 272 in the array 270.

With respect to FIG. 16, the string 270 of beacons 272 extend across helicopter 30 on the underside of the helicopter rearwardly of main probe 40. Once again each beacon 272 is spaced from the next by about 1 foot.

With reference to FIG. 18, a system for locating the aircraft is shown.

Figure 17:
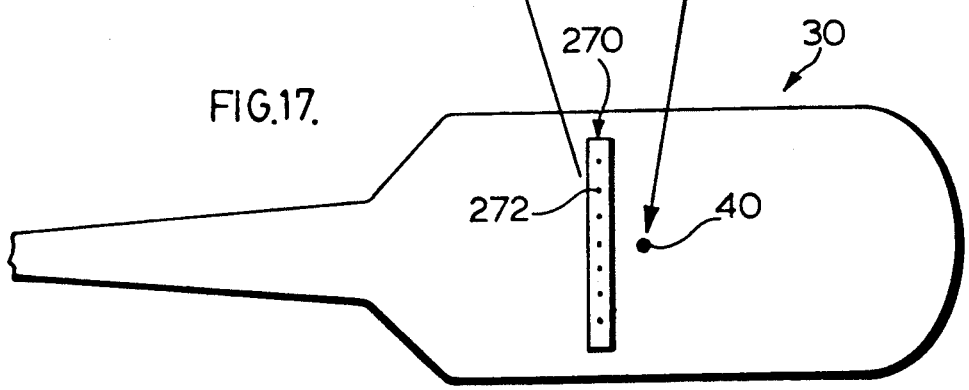

With reference to FIGS. 18 through 22 inclusive, there is shown schematically a system used for processing information from one or string of IRED (infrared emitting diode) beacon 272 on the underside of the helicopter. The pin point light of from the narrow band of light emitted by beacon 272 passes into the video camera 51 through the filter 330 before the lens system 332, through the lens system 332, through filter 334, and after the lens system 332. The light beam emitted from the beacon 272 have been pulsed to increase the peak power output of the beacon (or more than one beacon) without increasing the power dissipation beyond the level recommended by the manufacturer. By synchronizing the shuttering of the camera 51 using the synchronization generator 300 to the pulses emitted by the IRED beacon or beacons (in this regard see FIGS. 16 and 17), the intensity ratio of the beacon to sun image is increased to favour the beacon. Shuttering of the camera also "freezes" the beacon image thereby enhancing system performance. In order to synchronize the shuttering of the camera 50 with the IRED beacons, beacon pulse detector 53 has been provided connected to the synchronization generator 300. Because an interface television frame-rate camera operates at 30 frames per second or 60 fields per second and shuttering occurs at field rate, the beacons 270 mounted on the aircraft are designed to emit 60 pulses per second to coincide with the shuttered field action of the camera. (In the case of a frame shuttered camera, the beacon pulse rate can be 60 pulses per second). As previously indicated, the synchronization of the camera to the beacons was achieved through the use of the beacon pulse sensor mounted near the camera. It may also be mounted in the camera. The beacon pulse sensor detector 53 detects the arrival of the pulses emitted by the beacons when the aircraft is in the field of view of the camera. The output signal of the beacon pulse detector 53 is fed to the external synchronization input of the camera causing shutter operation to be synchronized with the beacon emissions. The radiation emitted by the beacons is then utilized at maximum efficiency as the beacon's "on" time coincides with the open shutter producing a high intensity image. In this regard, also see FIG. 18A.

Figure 19:
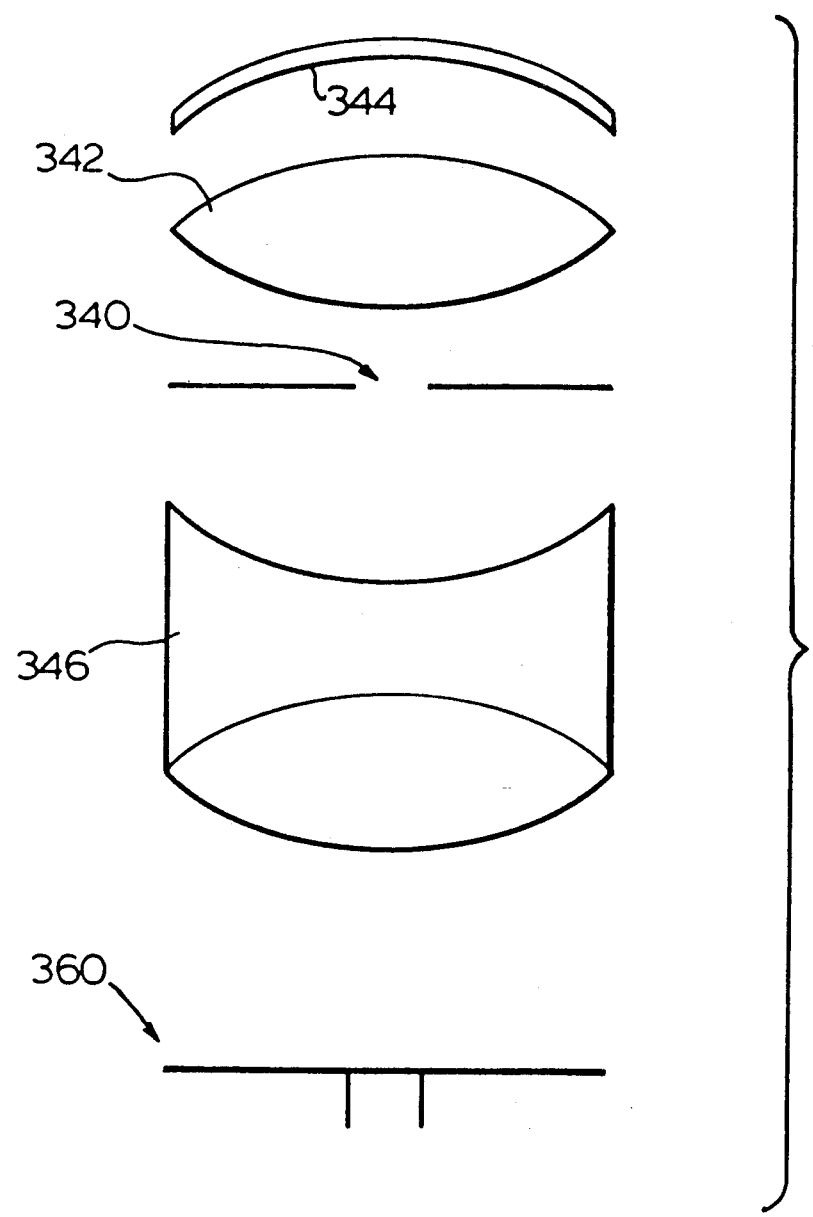

With reference to FIGS. 18, 19 and 20, camera 51 is shown to have different lens systems. With reference to FIG. 19, aperture 340 is positioned between target imaging element 342 covered by a front curved band-pass filter 344 on its front face and rear imaging element 346 carrying rear curved band-pass filter on its rear face. With reference to FIGS. 18 and 20, planar band-pass filters 330 and 334 are provided both before and after lens system 332. The front band-pass filter may be a Corion number S10-800F which is two inches in diameter and the rear band-pass filter may be a Corion number S10-800R, being one inch in diameter.

Lens blooming is the name given to the phenomenon which occurs when direct solar radiation enters the camera lens totally obliterating the intended image. Prevention of lens blooming is therefore achieved by limiting solar radiation. However, solar radiation is a continuum in the frequency spectrum: it contains no frequency "gaps" or "windows" into which images of a certain frequency might be placed to allow them to be visible in all lighting conditions. Therefore, this undesired radiation will be selectively reduced by the use of the two filters.

FIG. 20 shows the lens system sandwiched between the two flat Corion optical band-pass filters whose purpose is to allow passage of the light emitted by the beacons and to prevent the passage of light from another source, the sun.

The centre of the band-pass of the Corion filters has been chosen to be the same as the centre of the narrow band beacon emission. In this case, the operating wavelength is 800 nm. and the bandwidth of the filters is ±5 nm., centered on 800 nm.

The front filter 330 will stop nearly 99% of the solar radiation while allowing passage of the beacon emission and that portion of the solar radiation centered on 800 nm. However, all rays which enter the lens are reflected internally by the lens surface, producing changes in the angle of the path followed by the ray. This angular change increases the effective wavelength of these rays and most will be altered beyond 805 nm. Since the second band-pass filter allows 800 nm., ±5 nm., to pass, these rays will not be able to exit the filter because they fall outside the band-pass.

With reference to FIGS. 19 and 21, the lenses 342 and 346 of the camera 50 is focused onto a matrix of sensors 360(A), the signal from which may spill over into other sensors in the matrix. By shuttering the light sensors, camera blooming is reduced.

Camera blooming degrades the operation of a vision system and is different from lens blooming.

Camera blooming is caused by a local oversupply of photon generated changes in the individual photosites, called pixels, of a solid state camera. The excess charge tends to spill over into adjacent pixels and into the transport mechanisms that carry the charge to the video output line. This effect manifests itself in loss of detail in the video picture, the appearance of white streaks, and in the gross enlargement of highlighted areas. Camera designers used various means to control these undesirable effects, one of which is called shuttering.

FIG. 21 shows the active area of a so-called shuttered CCD (Charged Coupled Device Model TIES 50 by NEC (Nippon Electric Company) array camera. The area consists of an image plane (image producing pixel array) 370 and a storage area (image storage and readant area—metallized light shield) 372. The image plane 370, on which the optical image is converted to an electric charge, contains the pixels arranged in rows and columns. At the end of the exposure, the charge packets are transferred to the storage area 372 which is protected from further exposure to light by a metallized surface. The image is then read out by transferring the charge packets row by row to the video line. The exposure of the image plane 370 to light, followed by the transfer to the storage area 372, is similar to the mechanical shuttering of film cameras. The Charge Coupled Device may be replaced by a Charge Injection Device (CID) (for example, Model 2500 from General Electric).

Camera blooming is thus controlled by avoiding excessive charge build-up through the use of short exposure times. Reduced camera blooming thus brings about an improvement in the video picture quality without the requirement for human interpretation. The human operator is therefore removed from the system and beacon acquisition is fully automated.

Once the image has been generated by the camera and stored, the analogue video information is then digitized by Flash Converter, for example, Model MC10319L manufactured by Motorola, referred to as 380. The digitized information is then stored in computer memory 382.

The helicopter position above the landing area is computed from the X-Y co-ordinates location in pixel co-ordinates of the beacon images. For computational purposes, the video output of the camera has been digitized and resulting digital data stored in RAM Memory 382 of the computer is analysed by the micro processor 384 (in this case Model TMS 320C25).

The data rate of the digitized video is 10 million byte/sec. Due to the limitation in processing speed, current digital processors are unable to process in realtime all the data generated by a video camera. In the tracking system 50, only the data in the vicinity of the beacon images needs to be processed, because the rest of the video field contains no relevant information. Locating the beacons in a video field takes longer, but once located, following them is much quicker.

In this embodiment, zones of interest, called "windows" 400 are placed around the images of the beacons 402 once the beacons and images are located. Data within the windows is analyzed and beacon location is computed. Once a beacon's location is known, the "window" 400 surrounding it is adjusted to place the beacon's image in the window's centre. The appropriate algorithm as could be calculated by a man skilled in the art is used to keep images centered within their respective windows.

The video field outside the windows is of no interest to the processing algorithms and is ignored. To reduce computational load on the processor 384 and to speed up the generation of windows, an integrated "window" generator circuit is utilized: it transfers only the data from the "windowed" areas 400 to the processor 384 for analysis.

Figure 22:
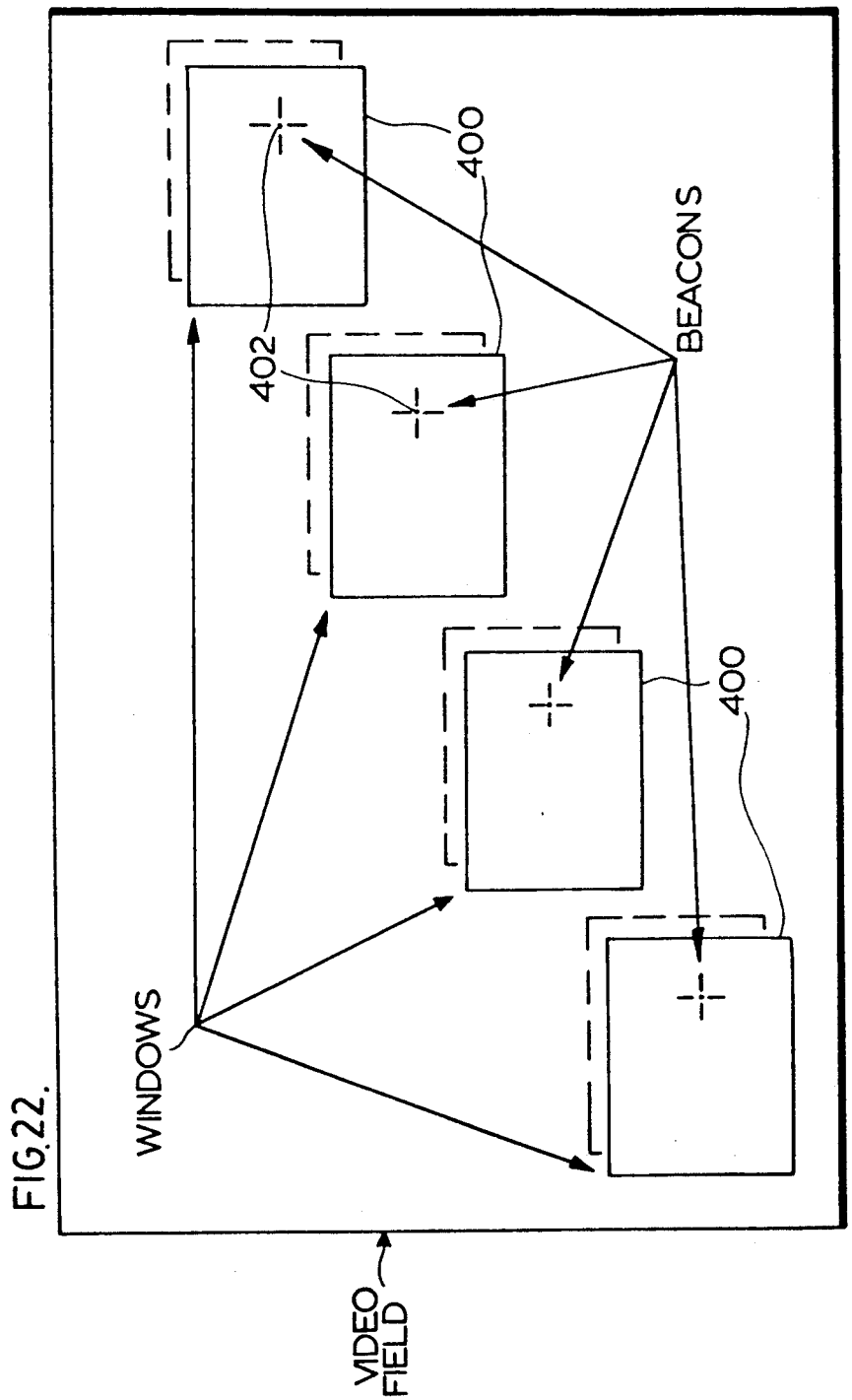
FIG. 22 illustrates diagrammatically a portion of the operation of the system shown in FIG. 18.

FIG. 22 illustrates the windows 400 surrounding beacon images in two subsequent video fields. Solid lines indicate the first scan: broken lines indicate the second.

From the beacon positions, as for example, shown in FIG. 22, the X and Y coordinates and altitude of the aircraft (helicopter) can be extracted using geometric calculations carried out by the micro processor 384. This may be accomplished using any suitable stored programme in the computer. The digital output of the microprocessor 384 may then be converted to an analogue output and as shown, the analogue output may refer to the X and Y co-ordinates and the altitude of he aircraft as at 306, 308 and 310, and an output to drive the winch 312 to position the RSD (Rapid Securing Device) 48 in close proximity to the anticipated position whereat the helicopter will land. In this regard, once the helicopter 30 has landed, the probe is immediately captured with little additional movement fore and aft by the RSD. In fact, because of the precise ability of the system to position the RSD 48 relative to the probe 40, the exact instant of touchdown could be determined and the securing means could be immediately started across the face of the RSD to immediately secure the probe of the helicopter 30 upon touchdown.

With reference to FIG. 23, helicopter 400 is shown carrying an array of beacons 402 on its front 404 and video cameras 406 and 408 have been mounted on the hangar as at 410 and 412 respectively. The cameras may be constructed with the filters and lens systems as shown in FIGS. 19 and 20 and the system connected to the cameras may be that shown in FIG. 18, except that, the cameras will look angularly from the front of the hangar and will not have the ability to achieve a "0" error reading as with the embodiment previously described (with the camera 51 upwardly directed). As well, the cameras 406 and 408 may each incorporate a beacon pulse detector with the lens system in the manner as previously described. The beacons 402 are once again pin point narrow band beacons (less than about 30/1000 inches in size) for acting as a point source of light.

As many changes can be made to the embodiments without departing from the scope of the invention, it is intended that all material contained herein be interpreted as illustrative of the invention and not in a limiting sense.

The embodiments of the invention in which an exclusive property or privilege is claimed are as follows:

1. An improved system including a moveable base suitable for use in landing and securing a craft on board a ship, the system comprising at least one radiation sensor, and at least one emitter positioned in a recognizable manner and means to receive signals from the at least one sensor to be used to determine the craft's immediate position and orientation to assist the craft in a safe landing on the ship, the base being moveable from a position remote the landing area to a position proximate the landing area to assist the craft in a safe landing and the securing thereof on the ship in response to the signals received by said at least one radiation sensor.

2. The system of claim 1 wherein the craft is an aircraft and the at least one emitter of the system comprises an array of emitters.

3. The system of claim 2 wherein the at least one sensor is directed upwardly generally towards the craft.

4. The system of claim 1 wherein the at least one sensor is directed upwardly generally towards the craft.

5. The system of claim 4 or 3 wherein the at least one sensor is directed generally vertically towards the craft.

6. The system of claim 1 wherein the at least one radiation sensor comprises at least two separate radiation sensors in the system.

7. The system of claim 6 wherein the at least two radiation sensors are directed upwardly generally towards the craft.

8. An improved system including a moveable base suitable for use in landing and securing a craft on board a ship, the system comprising one radiation sensor and at least one emitter positioned in a recognizable manner and means to receive signals from the at least one sensor to be used to determine the craft's immediate position and orientation to assist and secure the craft in a safe landing on the ship, the base being moveable from a position remote the landing area to a position proximate the landing area to assist the craft in a safe landing and the securing thereof on the ship in response to the signals received by said at least one radiation sensor.

9. The system of claim 8 wherein the craft is an aircraft and the at least one emitter of the system comprises an array of emitters.

10. The system of claim 9 wherein the one sensor is directed upwardly generally towards the craft.

11. The system of claim 10 wherein the at least two radiation sensors are directed generally vertically.

12. The system of claim 8 wherein the one sensor is directed upwardly generally towards the craft.

13. The system of claim 12 or 10 wherein the one sensor is directed generally vertically towards the craft.

14. An improved system suitable for use in landing and securing an aircraft on shipboard comprising a reciprocal support, base, platform or housing, the support, base, platform or housing carrying an upwardly directed light sensor and means for securing the aircraft to the support, housing, base or platform, wherein the support, base, platform or housing is reciprocal from remote a landing area on the deck of a ship to a position proximate the landing area to assist the craft in a safe landing and the securing thereof on the ship by said means for securing the aircraft to the support in response to the signals received by said light sensor.

15. The system of claim 14 wherein the support base, platform or housing also comprises a pulse detector in close proximity to the upwardly directed radiation sensor.

16. The system of claim 14 or 15 wherein the light sensor is a video camera.

17. The system of claim 15 wherein the light sensor comprises a lens system and a pair of band-pass filters, one filter before the lens system of the sensor and one after the lens system, the filters each passing the identical wavelength of light at its center but which each need not have the same band width as the other.

18. The system of claim 15 wherein the aircraft carries at least one emitter of light on the underside thereof.

19. The system of claim 18 wherein the at least one emitter of light comprises an array of emitters spaced predetermined distances from one another, each emitting a narrow band of light at a predetermined frequency or wavelength.

20. The system of claim 18 wherein the light sensor comprises a lens system and a pair of band-pass filters, one filter before the lens system of the sensor and one after the lens system, the filters each passing the identical wavelength of light at its center but which each need not have the same band width as the other.

21. The system of claim 20 wherein the at least one emitter of light comprises an array of emitters spaced predetermined distances from one another, each emitting a narrow band of light at a predetermined frequency or wavelength.

22. The system of claim 14 wherein the aircraft carries at least one emitter of light on the underside thereof.

23. The system of claim 22 wherein the light sensor comprises a lens system and a pair of band-pass filters, one filter before the lens system of the sensor and one after the lens system, the filters each passing the identical wavelength of light at its center but which each need not have the same band width as the other.

24. The system of claim 23 wherein the at least one emitter of light comprises an array of emitters spaced predetermined distances from one another, each emitting a narrow band of light at a predetermined frequency or wavelength.

25. The system of claim 22 wherein the at least one emitter of light comprises an array of emitters spaced predetermined distances from one another, each emitting a narrow band of light at a predetermined frequency or wavelength.

26. The system of claim 14 wherein the radiation sensor comprises a lens system and a pair of band-pass filters, one filter before the lens system of the sensor and one after the lens system, the filters each passing the identical wavelength of light at its center but which each need not have the same band width as the other.

27. Suitable for use in the landing of an aircraft a radiation sensor having a lens system comprising a pair of band-pass filters, one filter before the lens system of the sensor and one after the lens system, the filters passing the identical center wavelength light but which need not have the same band width.

28. The radiation sensor of claim 27 wherein the radiation sensor is a pulse detector.

29. The radiation sensor of claim 27 wherein the radiation sensor is a camera.

30. The radiation sensor of claim 29 wherein the radiation sensor is a pulse detector.

31. The radiation sensor of claim 29 wherein the camera is a video camera.

32. The radiation sensor of claim 31 wherein the radiation sensor is a pulse detector.

33. The radiation sensor of claim 27, 29 or 31 wherein the band-pass filters are planar.

34. The radiation sensor of claim 27, 29 or 31 wherein the band-pass filters are curved.

35. An improved system including a moveable base suitable for use in landing and securing a craft on board a ship, the system comprising at least one radiation sensor, and at least one emitter positioned in a recognizable manner and means to receive signals from the at least one sensor to be used to determine the craft's immediate position and orientation to assist the craft in a safe landing on the ship, the means to receive signals from the at least one sensor including signal processing means to process the signals received from the sensors, the processed signals to be used to determine the craft's immediate position and orientation, the base being moveable from a position remote the landing area to a position proximate the landing area to assist the craft in a safe landing and the securing thereof on the ship in response to the signals received by said at least one radiation sensor.

36. The system of claim 1, 8, 14, or 35 wherein the base or support is a traverser.

37. A capturing, securing and traversing system for an RPV carrying light emitters suitable for use on shipboard, the system comprising a support or platform comprising an upwardly directed radiation sensor in communication with means to receive signals from the radiation sensor including processing of the sensed signals by processing means which processes the signals received from the sensors, the processed signals to be used to determine the RPV's immediate position and orientation, the platform having a plurality of slots, each slot carrying a vertically extending arm moveable in the slot, the arm carrying means for securing to a support of the RPV when the arm is moved radially towards the center of the support or platform and means for moving the arms in the slots whereby detection of the emitters carried by the RPV by the radiation sensor and the means to receive signals from the radiation sensor including processing of the sensed radiation by said signal processing means which processes the signals received from the sensors, the processed signals to be used to determine the RPV's immediate position and orientation permitting the RPV to be landed on the platform and the moving of the arms after the means on the arms engage and secure the support to the system can be used to cause the RPV to be moved to center the RPV on the platform.

* * * * *